United States Patent
Yamasaki et al.

(10) Patent No.: US 6,464,874 B1
(45) Date of Patent: Oct. 15, 2002

(54) WASTE WATER TREATMENT METHOD AND WASTE WATER TREATMENT APPARATUS

(75) Inventors: Kazuyuki Yamasaki, Hiroshima; Norio Sawai, Kitakatsuragi-gun; Kazumi Chujou, Ayauta-gun, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 78 days.

(21) Appl. No.: 09/637,857

(22) Filed: Aug. 15, 2000

(30) Foreign Application Priority Data

Aug. 20, 1999 (JP) .................................. 11-233786

(51) Int. Cl.⁷ .............................. C02F 3/00; C02F 1/52
(52) U.S. Cl. .................. 210/601; 210/620; 210/702; 210/195.2; 210/202; 210/205; 210/903; 210/908; 210/915; 210/631
(58) Field of Search .............................. 210/601, 621, 210/605, 610, 614–617, 620, 630, 631, 723, 726–727, 732–734, 195.1, 195.2, 198.1, 201, 202, 205, 903, 908, 915, 702; 423/155, 158, 163

(56) References Cited

U.S. PATENT DOCUMENTS

| | | | | |
|---|---|---|---|---|
| 2,780,523 A | * | 2/1957 | Gloss | |
| 4,136,199 A | * | 1/1979 | Mills | |
| 4,256,573 A | * | 3/1981 | Shimodaira et al. | |
| 4,481,112 A | * | 11/1984 | Hitzel | |
| 5,043,072 A | * | 8/1991 | Hitotsuyanagi et al. | |
| 5,288,407 A | * | 2/1994 | Bodwell et al. | |
| 5,702,604 A | | 12/1997 | Yamasaki et al. | |
| 5,766,440 A | * | 6/1998 | Ino et al. | |
| 5,910,251 A | * | 6/1999 | Allen et al. | |
| 6,027,649 A | * | 2/2000 | Benedek et al. | |
| 6,228,267 B1 | * | 5/2001 | Yamasaki et al. | |
| 6,261,456 B1 | * | 7/2001 | Yamasaki et al. | |
| 6,267,892 B1 | * | 7/2001 | Wada et al. | |
| 6,331,256 B1 | * | 12/2001 | Kezuka et al. | |

FOREIGN PATENT DOCUMENTS

| | | |
|---|---|---|
| JP | 060860988 | 3/1994 |
| JP | 2503806 B2 | 4/1996 |
| JP | 9070599 | 3/1997 |

* cited by examiner

Primary Examiner—David A. Simmons
Assistant Examiner—Fred Prince
(74) Attorney, Agent, or Firm—Nixon & Vanderhye, P.C.

(57) ABSTRACT

In the waste water treatment apparatus, organic matter-containing fluorine waste water is treated in a reaction tank into which biological sludge and calcium-containing chemical sludge are introduced, thus making it possible to treat organic matters in the waste water by microorganisms contained in the biological sludge, and simultaneously to treat fluorine in the waste water by the calcium-containing chemical sludge. Therefore, since organic matters in the waste water and fluorine in the waste water, which differ in chemical properties from each other, can be treated with one reaction tank, it is no longer necessary to provide two reaction tanks, thus allowing the initial cost to be reduced. That is, this waste water treatment apparatus is capable of reducing the quantity of waste materials and reducing both initial cost and running cost.

28 Claims, 23 Drawing Sheets

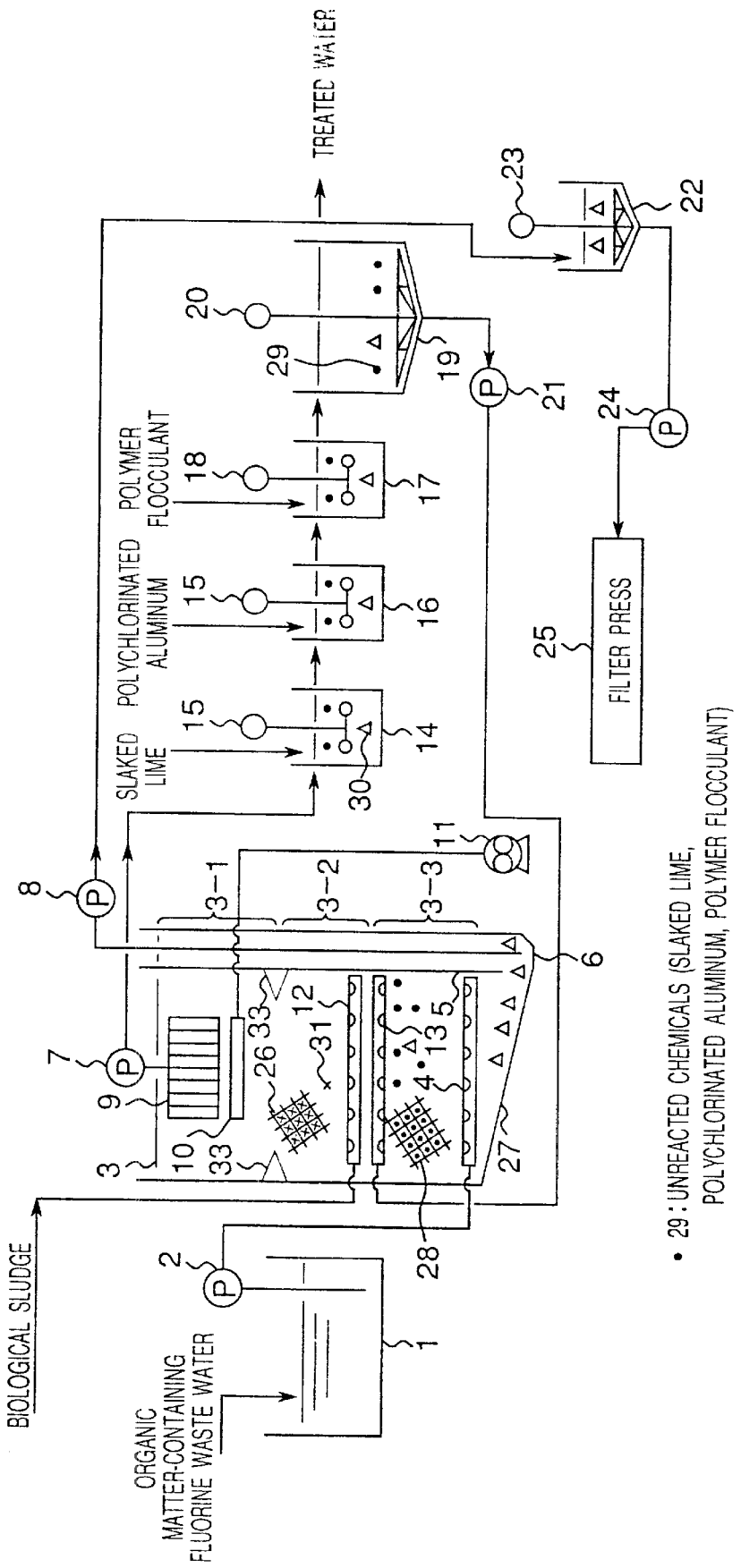

Fig.2A

WITH NORMAL CONCENTRATION OF
ORGANIC MATTER-CONTAINING FLUORINE WASTE WATER

| TANK NAME | RETENTION TIME | TIMING (ELAPSED TIME) 1H-19H |
|---|---|---|
| 1ST WATER TANK | 2 HRS | 1H–2H |
| 2ND WATER TANK LOWER PART | 2 HRS | 3H–4H |
| 2ND WATER TANK INT. PART | 2 HRS | 5H–6H |
| 2ND WATER TANK UPPER PART | 2 HRS | 7H–8H |
| 3RD WATER TANK | 1 HR | 9H |
| 4TH WATER TANK | 1 HR | 10H |
| 5TH WATER TANK | 1 HR | 11H |
| 6TH WATER TANK (SETTLING TANK) | 3 HRS | 12H–14H |
| 7TH WATER TANK (CONC. TANK) | 5 HRS | 15H–19H |

Fig.2B

WITH NORMAL CONCENTRATION OF
ORGANIC MATTER-CONTAINING FLUORINE WASTE WATER

| TANK NAME | RETENTION TIME | TIMING (ELAPSED TIME) |
| --- | --- | --- |
| | | 1H 2H 3H 4H 5H 6H 7H 8H 9H 10H 11H 12H 13H 14H 15H 16H 17H 18H 19H |
| 1ST WATER TANK | 2 HRS | |
| 2ND WATER TANK LOWER PART | 1 HR | |
| 2ND WATER TANK INT. PART | 1 HR | |
| 2ND WATER TANK UPPER PART | 1 HR | |
| 3RD WATER TANK | 1 HR | |
| 4TH WATER TANK | 1 HR | |
| 5TH WATER TANK | 1 HR | |
| 6TH WATER TANK (SETTLING TANK) | 3 HRS | |
| 7TH WATER TANK (CONC. TANK) | 5 HRS | |

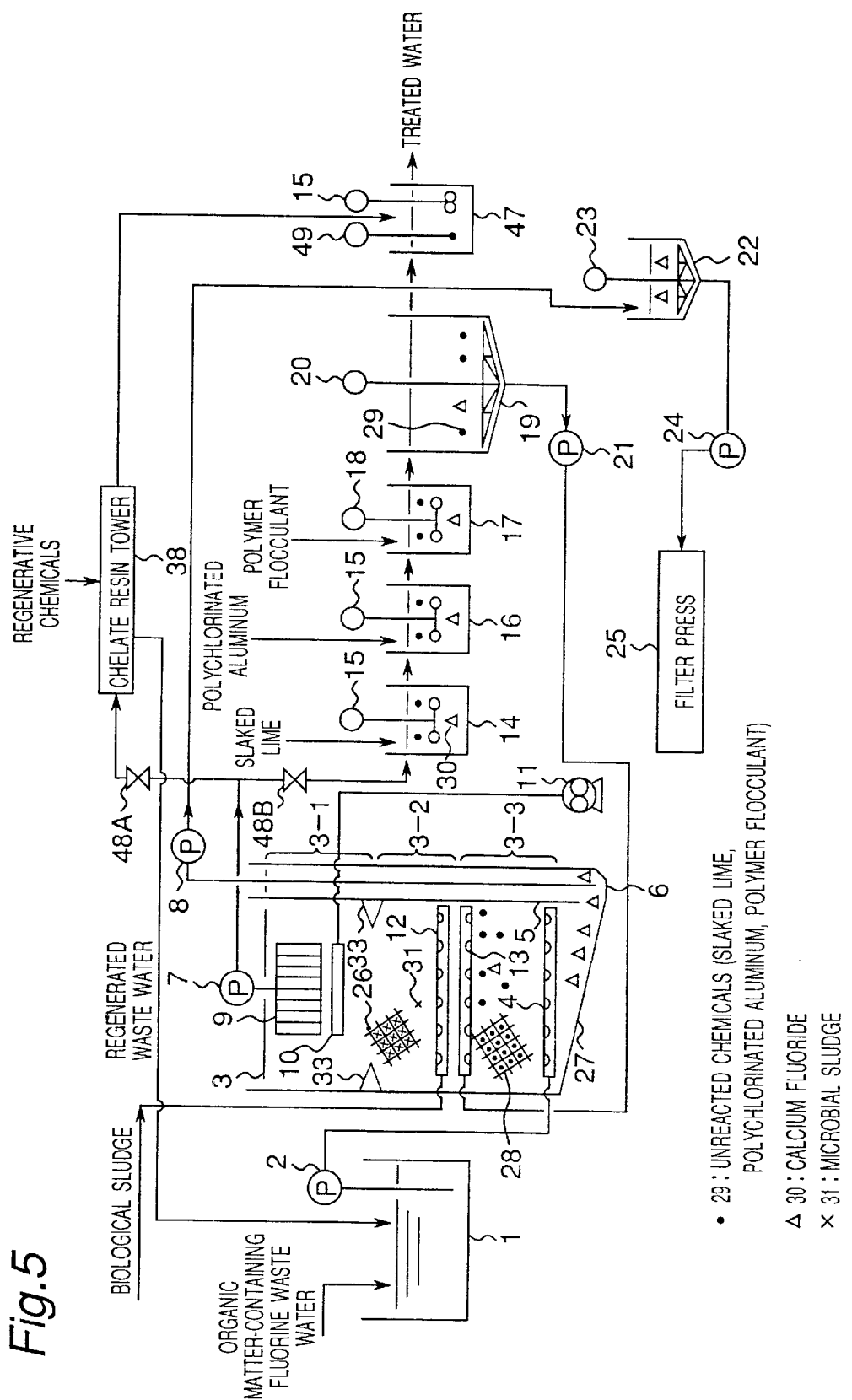

Fig.6A

WITH NORMAL CONCENTRATION OF
ORGANIC MATTER-CONTAINING FLUORINE WASTE WATER

| TANK NAME | RETENTION TIME | TIMING (ELAPSED TIME) 1H 2H 3H 4H 5H 6H 7H 8H 9H 10H 11H 12H 13H 14H 15H 16H 17H 18H 19H |
|---|---|---|
| 1ST WATER TANK | 2 HRS | |
| 2ND WATER TANK LOWER PART | 2 HRS | |
| 2ND WATER TANK INT. PART | 2 HRS | |
| 2ND WATER TANK UPPER PART | 2 HRS | |
| 3RD WATER TANK | 1 HR | |
| 4TH WATER TANK | 1 HR | |
| 5TH WATER TANK | 1 HR | |
| 6TH WATER TANK (SETTLING TANK) | 3 HRS | |
| 7TH WATER TANK (CONC. TANK) | 5 HRS | |
| CHELATE RESIN TOWER | 20MIN | |
| JUNCTION TANK | 20MIN | |

Fig.6B

WITH NORMAL CONCENTRATION OF
ORGANIC MATTER-CONTAINING FLUORINE WASTE WATER

| TANK NAME | RETENTION TIME | TIMING (ELAPSED TIME) |||||||||||||||||||
|---|---|---|---|---|---|---|---|---|---|---|---|---|---|---|---|---|---|---|---|
| | | 1H | 2H | 3H | 4H | 5H | 6H | 7H | 8H | 9H | 10H | 11H | 12H | 13H | 14H | 15H | 16H | 17H | 18H | 19H |
| 1ST WATER TANK | 2 HRS | — | — | | | | | | | | | | | | | | | | | |
| 2ND WATER TANK LOWER PART | 1 HR | | | — | | | | | | | | | | | | | | | | |
| 2ND WATER UPPER INT. PART | 1 HR | | | | — | | | | | | | | | | | | | | | |
| 2ND WATER TANK TANK PART | 1 HR | | | | | — | | | | | | | | | | | | | | |
| 3RD WATER TANK | 1 HR | | | | | | — | | | | | | | | | | | | | |
| 4TH WATER TANK | 1 HR | | | | | | | — | | | | | | | | | | | | |
| 5TH WATER TANK | 1 HR | | | | | | | | — | | | | | | | | | | | |
| 6TH WATER TANK(SETTLING TANK) | 3 HRS | | | | | | | | | — | — | — | | | | | | | | |
| 7TH WATER TANK(CONC. TANK) | 5 HRS | | | | | | | | | | | | — | — | — | — | — | | | |
| CHELATE RESIN TOWER | 20MIN | | | | | | — | | | | | | | | | | | | | |
| JUNCTION TANK | 20MIN | | | | | | — | | | | | | | | | | | | | |

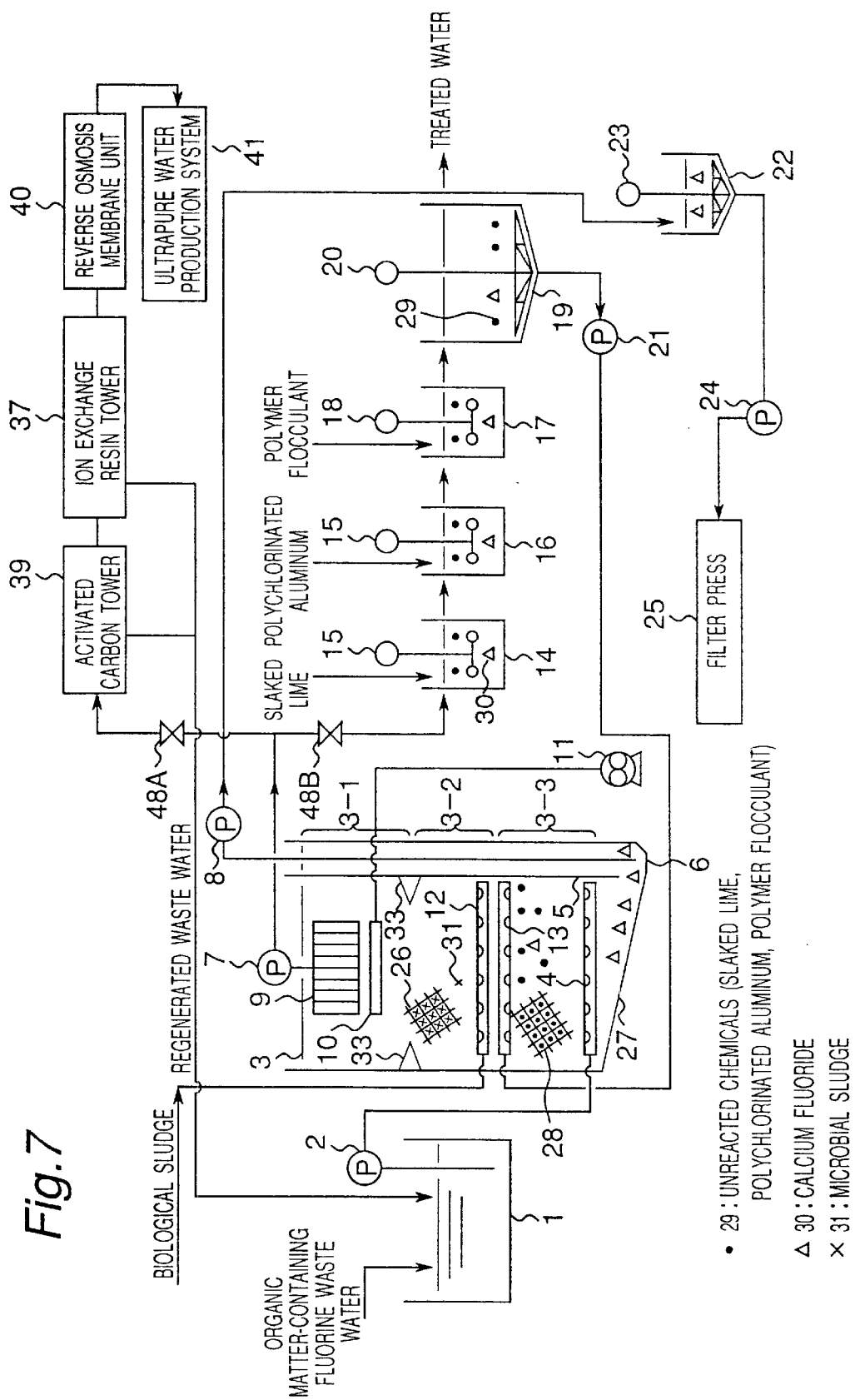

WASTE WATER TREATMENT METHOD AND WASTE WATER TREATMENT APPARATUS

BACKGROUND OF THE INVENTION

The present invention relates to a waste water treatment method as well as a waste water treatment apparatus capable of simultaneously and effectively treating organic matters and fluorine contained in waste water with respect to organic matter-containing fluorine waste water discharged from semiconductor factories so that sludge produced from the waste water treatment apparatus is minimized.

Generally, in conventional fluorine-related waste water treatment, there have been provided no waste water treatment apparatuses in which both chemical sludge zone and biological sludge zone are present in one reaction tank.

Also, in conventional common waste water treatment, there have been provided no waste water treatment apparatuses in which three zones of (1) chemical sludge zone, (2) biological sludge zone and (3) aeration zone equipped with a membrane separation unit are built in one reaction tank.

Further, conventionally, there have been provided no waste water treatment apparatuses capable of treating fluorine and nitrate nitrogen contained in waste water simultaneously in one reaction tank.

Further, there have been provided neither fluorine waste water treatment methods nor waste water treatment apparatuses which treat nitrate nitrogen, a component other than fluorine, by recycling high-concentration biological sludge produced from other waste water treatment equipment so as to reduce waste materials.

Further, there have been provided neither waste water treatment methods nor waste water treatment apparatuses for transferring settlings derived from a reaction tank not to a settling tank but directly to a concentration tank, where a dehydrating process is performed so as to reduce waste materials.

(First Prior Art Example)

Now a first prior art example relating to waste water treatment of fluorine waste water is described in detail with reference to FIG. 16. The waste water treatment apparatus of this first prior art example does not include any recycling process of sludge containing unreacted chemicals. The waste water treatment apparatus cannot remove any nitrate nitrogen contained in waste water.

In this waste water treatment apparatus, fluorine waste water is introduced to a raw water tank 101. Fluorine waste water stored in the raw water tank 101, after controlled in water quality and water quantity, is transferred to a slaked lime reaction tank 114 by a raw water tank pump 102. In this slaked lime reaction tank 114, calcium derived from added slaked lime and fluorine contained in the waste water react with each other, resulting in calcium fluoride 130 as a reaction product.

Unfortunately, although a rapid agitator 115 as an agitator means for accelerating the reaction is set at the slaked lime reaction tank 114 and serving for agitation therein, unreacted slaked lime flows out of the slaked lime reaction tank 114 so as to enter into a polychlorinated aluminum reaction tank 116, because of the waste water retention time in the slaked lime reaction tank 114 being within 1 hour. At this polychlorinated aluminum reaction tank 116, a rapid agitator 115 is set as well, so that granular calcium fluoride 130 as a reaction product generated through reaction in the slaked lime reaction tank 114 is flocculated by polychlorinated aluminum as an inorganic flocculant, thus forming flocs.

Also, unreacted slaked lime is also flocculated by polychlorinated aluminum, forming flocs. These flocculated flocs of slaked lime are not in the form of calcium ions, utterly ineffective for fluorine treatment, hence a waste of chemicals and resulting in unreacted chemicals 129.

Then, polymer flocculants are added in a polymer-flocculant flocculation tank 117, so that the flocs of calcium fluoride 130 are formed into more stable, larger flocs. Meanwhile, unreacted flocs due to slaked lime, although ineffective for fluorine treatment, are also formed into more stable, larger flocs by the addition of the polymer flocculants.

The more stable, larger flocs of calcium fluoride 130 and the more stable, larger flocs of slaked lime flow into a settling tank 119, settling there, and are collected together to the center of the bottom of the settling tank 119 by a settling-tank collector 120. These scraped-up flocs result in sludge. That is, the quantity of this sludge is a total of sludge due to the calcium fluoride 130, and unreacted slaked lime sludge or unreacted flocculant sludge, i.e., sludge due to the unreacted chemicals 129, which has been a cause of high volume of waste materials.

Then, the sludge scraped up to the bottom center of the settling tank 119 flows into, and is concentrated by, a concentration tank 122 where a concentration-tank collector 123 is set. Thereafter, the sludge is transferred to filter presses 125 by filter press pumps 124, and dehydrated there.

It is noted that two filter presses 125 are provided on account of high volume of sludge produced from this waste water treatment apparatus. Also, supernatant liquid of the concentration tank 122 is introduced to the raw water tank 101 through overflow piping (not shown).

Meanwhile, as a need of the times in these days, there are demands for a waste water treatment method and a waste water treatment apparatus which are small in the quantity of dehydrated cake after the dehydration, i.e., the quantity of sludge.

However, in the foregoing first prior art example, as described above, a large quantity of sludge would be involved because of the generation of the sludge of calcium fluoride and the sludge of unreacted slaked lime (unreacted chemicals). Varying depending on the conditions of factory waste water and the way of operation of waste water treatment equipment, sludge relating to unreacted chemicals generally amounts to a double or more of the quantity of the calcium fluoride sludge.

(Second Prior Art Example)

Next, FIG. 17 shows a process flow for returning part of sludge derived from the settling tank 119 of the first prior art example to the raw water tank 101 by a sludge return pump 121 as a second prior art example. This second prior art example is also incapable of treating nitrate nitrogen, although capable of treating fluorine, in the waste water. However, in this second prior art example, since part of sludge derived from the settling tank 119 is returned to the raw water tank 101, sludge containing unreacted chemicals is consumed by fluorine waste water. On this account, the second prior art example is smaller in sludge generation, as compared with the first prior art example.

(Third Prior Art Example)

Next, FIG. 18 shows a process flow for returning part of sludge derived from the settling tank 119 of the first prior art example to the slaked lime reaction tank 114 by a sludge return pump 121 as a third prior art example. This third prior art example is also incapable of treating nitrate nitrogen, although capable of treating fluorine, in the waste water.

However, in this third prior art example, since part of sludge derived from the settling tank 119 is returned to the slaked lime reaction tank 114, sludge containing unreacted chemicals is consumed by fluorine waste water in the slaked lime reaction tank 114. On this account, the third prior art example is smaller in sludge generation, as compared with the first prior art example.

(Fourth Prior Art Example)

Next, FIG. 19 shows a process flow of a fourth prior art example. The waste water treatment apparatus of this fourth prior art example is capable of treating fluorine and some amount of nitrate nitrogen. The reason why the apparatus can treat some amount of nitrate nitrogen is that denitrifying bacteria as anaerobic organic matters are generated in upper part of a return sludge reaction tank 143 and treat nitrate nitrogen. However, in order to securely treat the nitrate nitrogen contained in the fluorine waste water of general semiconductor factories, the amount of denitrifying bacteria cannot be said enough.

According to the process flow of this fourth prior art example, fluorine waste water is introduced to a raw water tank 101. Fluorine waste water stored in the raw water tank 101, after controlled in water quality and water quantity, is transferred to the return sludge reaction tank 143 by a raw water tank pump 102.

At the return sludge reaction tank 143, the fluorine waste water is introduced through a lower inlet pipe 104 placed in lower part of a chemical sludge zone 145. As described above, in the return sludge reaction tank 143, fluorine waste water and sludge containing unreacted chemicals (a total of unreacted slaked lime and unreacted flocculants) 129 derived from the settling tank 119 have been introduced by the sludge return pump 121.

Since the sludge containing the unreacted chemicals 129 is introduced by the sludge return pump 121, the chemical sludge zone 145 is built at all times in the return sludge reaction tank 143.

In the chemical sludge zone 145, fluorine in the fluorine waste water and the calcium in the unreacted chemicals 129 react with each other, resulting in calcium fluoride 130. The arrangement that the fluorine in the fluorine waste water and the calcium in the unreacted chemicals 129 react with each other, resulting in calcium fluoride 130, facilitates the recycling of calcium and contributes to a reduction of sludge generation. However, since the sludge containing the unreacted chemicals (a total of unreacted slaked lime and unreacted flocculants) 129 derived from the settling tank 119 is introduced to the concentration tank 122, a complete recycling is not achieved.

In the meantime, since fluorine waste water is neutralized by return sludge in upper part of the chemical sludge zone 145 of the return sludge reaction tank 143, microorganisms grow naturally. The upper part of the chemical sludge zone 145 is not aerated and therefore anaerobic, so that anaerobic microorganisms such as denitrifying bacteria are developed. However, the quantity of microorganisms as denitrifying bacteria is not enough for high-degree treatment of nitrate nitrogen contained in the waste water of general semiconductor factories.

Also, with respect to the quantity of sludge generation, the waste water treatment apparatus of the fourth prior art example of FIG. 19 is indeed cut in the quantity of sludge generation as compared with the waste water treatment apparatus of the first prior art example of FIG. 16, but still insufficient.

In the fourth prior art example of FIG. 19, since the return sludge reaction tank 143 is not aerated, calcium fluoride 130 would be settled.

In the return sludge reaction tank 143, the settled calcium fluoride 130 increases in amount as time elapses, so that the zone height of the chemical sludge zone 145 rises. When the chemical sludge zone 145 increases in height, the calcium fluoride 130 and water to be treated (waste water) flow into the slaked lime reaction tank 114. In this slaked lime reaction tank 114, fluorine contained in the waste water reacts with calcium derived from new slaked lime, resulting in new calcium fluoride 130 as a reaction product. However, all the calcium does not result in the calcium fluoride 130, but unreacted calcium, i.e., unreacted slaked lime also exists.

There is a phenomenon noteworthy in this connection. That is, a large amount of calcium fluoride 130 derived from the return sludge reaction tank 143 flows into the slaked lime reaction tank 114, and there is a phenomenon that the neutralization effect of slaked lime as an alkali decreases with increasing concentration of sludge. This, in turn, causes a phenomenon that a large amount of slaked lime is added to the slaked lime reaction tank 114. Further, whereas the rapid agitator 115 serving as an agitation means for acceleration of reaction is set and working for agitation at the slaked lime reaction tank 114, unreacted slaked lime would increase in amount due to the fact that the retention time of waste water in the slaked lime reaction tank 114 is within one hour, as well as the fact that the neutralization of slaked lime has weakened. This unreacted slaked lime flows out of the slaked lime reaction tank 114, flowing into the succeeding polychlorinated aluminum reaction tank 116 (polychlorinated aluminum flocculation tank). Then, the unreacted slaked lime results in unreacted slaked lime and unreacted flocculants, forming the unreacted chemicals 129.

Next, a rapid agitator 115 is also set at the polychlorinated aluminum reaction tank 116, and granular calcium fluoride 130 as a reaction product generated through reaction in the slaked lime reaction tank 114 is flocculated by polychlorinated aluminum as an inorganic flocculant, thus forming flocs. Also, unreacted slaked lime is also flocculated by polychlorinated aluminum, forming flocs. These flocculated flocs of slaked lime are utterly ineffective for fluorine treatment, hence a waste of chemicals and regarded as unreacted chemicals 129. Then, polymer flocculants are added in a polymer-flocculant flocculation tank 117, so that the flocs of calcium fluoride 130 are formed into more stable, larger flocs. Meanwhile, unreacted flocs due to slaked lime, although ineffective for fluorine treatment, are also formed into more stable, larger flocs by the addition of the polymer flocculant.

The more stable, larger flocs of calcium fluoride 130 and the more stable, larger flocs of slaked lime flow into a settling tank 119, settling there, and are scraped together to the center of the bottom of the settling tank 119 by a collector 120. These scraped-up flocs result in sludge. The quantity of this sludge is a total of sludge due to the reacted calcium fluoride 130 and sludge due to the unreacted chemicals 129.

Then, the sludge scraped up to the bottom center of the settling tank 119 by the settling-tank collector 120 is partly returned to the return sludge reaction tank 143 by the sludge return pump 121, and the unreacted chemicals (unreacted slaked lime and unreacted flocculants) 129 are recycled. Thus, the quantity of sludge produced from this waste water treatment apparatus is cut down, as compared with the waste water treatment apparatus of the first prior art example, which does not perform the recycling.

Meanwhile, the sludge due to part of the calcium fluoride 130 and the sludge due to the unreacted chemicals 129 such as unreacted slaked lime sludge flow into, and are concentrated by, the concentration tank 122 where a collector 123 is set. Thereafter, the sludge is transferred to a filter press 125 by a filter press pump 124, and dehydrated there. It is noted that supernatant liquid of the concentration tank 122 is introduced to the raw water tank 101 through overflow piping (not shown) as described before.

Sludge produced from the settling tank 119 in the waste water treatment apparatus of this fourth prior art example, indeed cut down, but contains sludge due to the calcium fluoride 130 and the sludge due to the unreacted chemicals 129. Therefore, the sludge generation is cut down in the waste water treatment apparatus of the fourth prior art example, compared with the waste water treatment apparatus of the first prior art example, but it could not be said enough. That is, the sludge due to the unreacted chemicals 129 is also introduced to the concentration tank 122 of the fourth prior art example, and this sludge is dehydrated by the filter press 125 after the concentration, resulting in sludge as a waste.

(Fifth Prior Art Example)

Next, FIG. 20 shows a fifth prior art example. The waste water treatment apparatus of this fifth prior art example can treat high amount of nitrate nitrogen contained in the waste water, but cannot when fluorine is present in the waste water.

The fifth prior art example of FIG. 20 involves a rather complex process flow because this prior art example performs high-degree treatment for both waste water treatment and exhaust gas treatment, where the reaction tank that plays a central role in microbial treatment is the part consisting of a reaction-tank upper part 359 and a reaction-tank lower part 360.

As shown in FIG. 20, a membrane filter 309 as a membrane separation unit is set at the reaction-tank upper part 359. Also, granule sludge 312, which is concentrated sludge as biological sludge, is formed at the reaction-tank lower part 360.

The upper part 359 and the lower part 360 are partitioned by a partitioning wall 311. Waste water is introduced through a waste water introducing pipe 313, and gradually ascending and reaching the upper part 359, where the waste water is micro-filtered by the membrane filter 309 set at the upper part 359.

Below the membrane filter 309 is installed an air diffusing pipe 310 provided for the membrane filter. The air diffusing pipe 310 is normally cleaning with air (aeration cleaning) the membrane filter 309 so that the membrane filter 309 is not blocked by sludge.

In this fifth prior art example, there is a problem that the waste water treatment apparatus, which performs microbial treatment, is indeed capable of biological treatment of organic matters and nitrate nitrogen contained in the waste water but incapable of chemical treatment of fluorine contained in the waste water as described before. That is, waste water containing both fluorine and organic matters/nitrate nitrogen at the same time could not be managed by one reaction tank.

Accordingly, for this fifth prior art example, it is necessary to design both a microbial treatment apparatus and a chemical treatment apparatus for waste water containing both fluorine and organic matters/nitrate nitrogen at the same time. This poses a problem that the construction cost increases.

(Sixth Prior Art Example)

Next, FIG. 21 shows a sixth prior art example (Japanese Patent Publication No. 2503806), which is a "Method for Treating Fluoride-Containing Water". This sixth prior art example is capable of fluorine treatment including high-degree treatment for fluorine but incapable of simultaneously treating fluorine and nitrate nitrogen in the waste water at one reaction tank.

In this sixth prior art example, calcium compounds are added to the water containing fluorides and sulfate ions at a reaction tank 201 so that a suspension adjusted to a pH of 6–8 is obtained. Next, the resulting suspension is introduced into a circulation tank 202, and liquid introduced from the circulation tank 202 to a membrane separation unit 203 is separated with the membrane so as to be separated into a permeate and a concentrate. Then, the concentrate discharged from the membrane separation process is circulated to the circulation tank 202, while the permeate from the membrane separation unit 203 is adsorbed at an adsorption tower 204. Thus, high-degree treatment of fluorine in the waste water is achieved.

The waste water treatment apparatus of this sixth prior art example mainly comprises of the reaction tank 201, the circulation tank 202, the membrane separation unit 203 and the adsorption tower 204. Therefore, this waste water treatment apparatus is effective for high-degree treatment of fluorine, or for low-concentration organic matters which are manageable when the adsorption tower 204 is an activated carbon tower.

However, when the waste water contains high-concentration organic matters, nitrate nitrogen, hydrogen peroxide or organochlorine compounds, their corresponding pieces of waste water treatment equipment are necessitated additionally. This causes a problem that the construction of the waste water treatment apparatus becomes more complex.

Also, when the waste water contains high concentration of organic matters, there is a problem that the membrane separation unit 203 or the adsorption tower 204 is blocked in short time.

Also, since unreacted calcium compounds in the circulation tank 202 are not recycled, there is a problem that high amounts of sludge generation result.

Also, since the membrane separation unit 203 is of a type other than the submerged membrane type, there is a need for a space where the membrane separation unit is additionally provided.

Also, since the adsorption tower 204 is provided, the waste water treatment apparatus is capable of high-degree treatment of fluorine in the waste water but incapable of freely changing the fluorine concentration in the waste water to economical concentrations.

(Seventh Prior Art Example)

As a seventh prior art example, there has been proposed a "method for treating waste water containing fluorine ions and hydrogen peroxide" described in Japanese Patent Laid-Open Publication No. HEI 6-86988.

In this waste water treatment method, slaked lime as an alkaline calcium-containing compound is added to waste water that contains fluorine ions and hydrogen peroxide, by which fluorine ions are formed into calcium fluoride. Thereafter, anionic polymer flocculants are added thereto, by which granular flocs are formed. Next, solid-liquid separation is done and thereafter catalase is added thereto, by which hydrogen peroxide is decomposed. In this method, since the sludge derived from the settling tank contains unreacted chemicals, there are problems that high amount of sludge generation is involved and that high running cost is involved on account of the addition of catalase for the decomposition of hydrogen peroxide in the waste water.

Also, in this seventh prior art example, which incapable of treating nitrate nitrogen and organochlorine compounds in the waste water, treatment equipment is additionally necessitated for their treatment, posing a further problem that the construction cost is increased.

Accordingly, problems to be solved by the present invention are roughly as follows:

(1) The prior arts have an issue that unreacted chemicals are not fully recycled. Therefore, an object is to efficiently recycle the sludge containing unreacted chemicals so that the quantity of produced waste materials (sludge quantity) is minimized;

(2) There is an issue that as nitrate nitrogen in the waste water has to be treated by newly providing a denitrification tank, constructing the denitrification tank separately would cause the construction cost to increase. That is, an object is to build a reaction tank capable of treating nitrate nitrogen by devising the reaction tank or other equipment, so that the construction cost is decreased;

(3) In the prior art techniques, the waste water treatment apparatus in which an adsorption tower (plastic tower) is installed would be incapable of economically treating fluorine in the waste water with making the quantity of fluorine as close to a target value as possible.

Therefore, in the waste water treatment apparatus in which an adsorption tower is provided, when the treatment target value is 3 ppm (a value that entails high-degree treatment) or lower, an object is to provide a new waste water treatment method or waste water treatment apparatus which makes it possible to ensure the set value (true target value: 2.5 ppm–2.9 ppm for economical treatment) as easily as possible; and (4) An object is to provide a method or apparatus for economically treating fluorine, organic matters, nitrate nitrogen, hydrogen peroxide and the like contained in acidic waste water of semiconductor factories by one reaction tank. Also, there are some cases which involve an issue that underground water containing organochlorine compounds has to be economically treated. That is, an object of the invention is to provide a new waste water treatment method or waste water treatment apparatus for economically treating fluorine, organic matters, nitrate nitrogen, hydrogen peroxide and organochlorine compounds contained in acidic waste water of semiconductor factories by one reaction tank.

First of all, the object (1) is described in detail.

As described above, whereas treatment of fluorine in the waste water is generally performed through waste water treatment by using slaked lime, polychlorinated aluminum or other inorganic flocculants and polymer flocculants, there would inevitably be formed flocs (sludge) due to unreacted chemicals in the reaction tank or flocculation tank. Those flocs would lead to an increase in the quantity of sludge generated from the waste water treatment equipment.

The formation of flocs due to unreacted chemicals, i.e. sludge, can be attributed to the following reasons:

(i) Because the reaction tank cannot be greatly increased in size in terms of construction cost, the retention time of waste water at the reaction tank is short, causing a problem that a perfect reaction as expressed by the following chemical equation could not be attained:

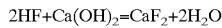
$$2HF + Ca(OH)_2 = CaF_2 + 2H_2O$$

More concretely, in a reaction tank of general waste water treatment equipment, the following chemical equation results,

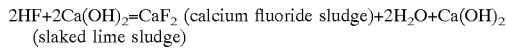
$$2HF + 2Ca(OH)_2 = CaF_2 \text{ (calcium fluoride sludge)} + 2H_2O + Ca(OH)_2$$
(slaked lime sludge)

where not only calcium fluoride sludge but also slaked lime sludge due to unreacted slaked lime flocs are generated.

If calcium ions are eluted by acid, slaked lime sludge discharges the function as a chemical and, therefore, is recycled desirably; and (ii) In an attempt to treat fluorine in the waste water to 15 ppm or lower, the fluorine in the waste water could not be treated up to the target fluorine concentration (15 ppm or lower) unless slaked lime as an excessive amount of calcium over fluorine is added. This is an empirical finding in fluorine waste water treatment, and thus an excessive amount of slaked lime is added in order to attain a fluorine concentration of 15 ppm or lower.

It is also conceivable that with a sludge return pump newly provided, settled sludge containing unreacted chemicals derived from the settling tank 119 in the waste water treatment apparatus having the foregoing process flow of the first prior art example of FIG. 16 is returned to the raw water tank 101 or the slaked lime reaction tank 114 by the sludge return pump so as to allow the unreacted chemicals to be recycled.

Also, as in the second prior art example of FIG. 17, there is a waste water treatment flow that settled sludge containing unreacted chemicals derived from the settling tank 119 is returned to the raw water tank 101 by the sludge return pump 121.

Also, as in the third prior art example of FIG. 18, there is a waste water treatment flow that settled sludge containing unreacted chemicals derived from the settling tank 119 is returned to the slaked lime reaction tank 114 by the sludge return pump 121.

Also, there is a waste water treatment apparatus of the fourth prior art example shown in FIG. 19. Settled sludge containing unreacted chemicals derived from the settling tank 119 in this waste water treatment apparatus is returned to the return sludge reaction tank 143 by the sludge return pump 121, and the unreacted chemicals are recycled.

When fluorine waste water is treated by these waste water treatment flows of the second, third and fourth prior art examples shown in FIGS. 17, 18 and 19, respectively, sludge concentration in the system (a total value of calcium fluoride sludge concentration and slaked lime sludge concentration) increases as time elapses. Whereas increase in sludge concentration has been considered not so significant, results of operation revealed a fact that given a high sludge concentration, slaked lime consumption considerably increases in the slaked lime reaction tank 114.

It was found that even if unreacted slaked lime as an unreacted chemical is returned to the raw water tank 101 or the polychlorinated aluminum reaction tank 116 or the return sludge reaction tank 143 with a view to recycling, increase in the sludge concentration of the slaked lime reaction tank 114 to 1000 ppm or higher would cause a negative phenomenon that the slaked lime consumption increases, conversely, in the slaked lime reaction tank 114 to which slaked lime is added. One of the reasons why the slaked lime consumption increases is that a high sludge concentration would cancel the efficacy of slaked lime as a chemical (efficacy for increasing the pH; more concretely, an efficacy of increasing the pH of fluorine waste water with a pH of 2–3 to neutrality or alkalescence), so that the slaked lime consumption increases. That is, the efficacy of increasing the pH of slaked lime as a chemical is canceled by a buffer action of sludge. It is noted that the addition of slaked lime in the slaked lime reaction tank 114 is performed by a general method of slaked lime addition control by means of pH setting, including ON/OFF control and proportional control.

The buffer action of sludge is explained here by a simple example. It is assumed that pH has become 10 as a result of adding 1 g of slaked lime to a specified amount of tap water. When 1 g of slaked lime is next added to the same amount of sludge water (sludge concentration: 1000 ppm), the pH comes not to 10 but to 8.5. This is a phenomenon showing the buffer action of sludge. Therefore, in order that the pH is set to 10, adding 1 g of slaked lime would be appropriate in the case of tap water, but larger amounts of slaked lime would be required in the case of waste water containing high volume of sludge.

Then, in the waste water treatment flows of the first to fourth prior art examples shown in FIGS. 16 to 19, unreacted chemicals could not be eliminated to zero as far as sludge is pulled out from the settling tank 119 to the concentration tank 122. In order to eliminate unreacted chemicals to zero, it is necessary to reconsider the whole waste water treatment system. That is, in order to recycle all the sludge containing unreacted chemicals and yet keep the functional performance of the whole waste water treatment equipment normal, a new water tank or system suited for the purpose is required.

The functions of the water tank desirably include:

(i) There is provided a return sludge reaction tank (reaction tank) in which fluorine waste water and sludge containing unreacted chemicals react with each other efficiently;

(ii) The apparatus is built so that no sludge flows out from the return sludge reaction tank; and (iii) Reaction product after the reaction can be easily separated and easily discharged out of the system.

By achieving these items (i), (ii) and (iii), the object (1) can be achieved; that is, a waste water treatment apparatus in which sludge containing unreacted chemicals is recycled and moreover any excessive consumption of chemicals due to increases in sludge concentration can be prevented can be realized.

Next, the object (2) is described in detail.

Since fluorine and nitrate nitrogen in the waste water are substances chemically different from each other, it is generally practiced that fluorine is treated by chemical treatment while nitrate nitrogen is treated by biological treatment. Therefore, it has been commonly practical that fluorine and nitrate nitrogen in the waste water are treated by separate reaction tanks. That is, it has been the case that fluorine is treated by a chemical reaction tank to which slaked lime is added, while nitrate nitrogen is treated by a denitrification tank in which anaerobic microorganisms are propagating. Like this, fluorine and nitrate nitrogen have been treated at independent tanks, respectively, which has been caused an increased construction cost.

Also, with high concentrations of fluorine and nitrate nitrogen in the waste water, it has been impossible to simultaneously and economically treat both fluorine and nitrate nitrogen by one reaction tank.

Next, the object (3) is described in detail with reference to the sixth prior art example shown in FIG. 21. The sixth prior art example shown in FIG. 21 is a method for treating fluoride-containing water, in which the system roughly comprises the reaction tank 201, the circulation tank 202, the membrane separation unit 203 and the adsorption tower 204 as described before. By virtue of the setting of the adsorption tower 204 at a terminal end, when the adsorption tower 204 is set with adsorbents such as anion exchange resin or chelate resin or activated alumina filled therein, the treatment target value of treated water, e.g. 3 ppm or lower, can be easily attained, resulting in a value of 1 ppm or lower.

However, when the treatment target value is set to 3 ppm or lower, it would be an economical waste water treatment method to perform normal treatment within a range of 2.5 ppm to 2.9 ppm, in which case adsorbents such as anion exchange resin or chelate resin or activated alumina are regenerated less frequently. That is, the running cost can be reduced.

In contrast to this, in the waste water treatment method of the sixth prior art example of FIG. 21, the total quantity of waste water passes through the adsorption tower 204, and the adsorbents adsorb fluorine. Therefore, the fluorine concentration in the treated water concretely becomes 1 ppm or lower, and the regeneration frequency increases. As a result, there is a drawback of high running cost.

Meanwhile, when the regeneration period of the adsorption tower 204 is prolonged, treated water quality worsens such that the target value of, for example, 3 ppm cannot be maintained, with the resulting value beyond 3 ppm.

Next, the object (4) is described in detail.

Acidic waste water of semiconductor factories generally contains fluorine, organic matters, nitrate nitrogen, hydrogen peroxide and the like. In some factories, there are cases where underground water containing organochlorine compounds needs to be treated. Fluorine and hydrogen peroxide are generally subjected to chemical treatment, while organic matters and nitrate nitrogen, in many cases, are generally subjected to microbial treatment. That is, there is an issue that there have been provided no methods or apparatuses capable of treating fluorine, organic matters, nitrate nitrogen, hydrogen peroxide and organochlorine compounds in the waste water economically by one reaction tank.

SUMMARY OF THE INVENTION

Accordingly, an object of the present invention is to provide a waste water treatment method and a waste water treatment apparatus capable of reducing the quantity of waste materials and moreover reducing both initial cost and running cost.

In order to achieve the above object, there is provided a waste water treatment method characterized by comprising a step of treating organic matter-containing fluorine waste water by a reaction tank into which biological sludge and calcium-containing chemical sludge are introduced.

Also, there is provided a waste water treatment apparatus characterized in that organic matter-containing fluorine waste water is treated by a reaction tank into which biological sludge and calcium-containing chemical sludge are introduced.

With these constitutions, since the biological sludge and the calcium-containing chemical sludge are introduced to one reaction tank, organic matters in the waste water can be treated by microorganisms contained in the biological sludge and fluorine can be treated by the calcium-containing chemical sludge. Therefore, since organic matters in the waste water and fluorine in the waste water, which differ in chemical properties from each other, can be treated with one reaction tank, it is no longer necessary to provide two reaction tanks, thus allowing the initial cost to be reduced.

In one embodiment of the present invention, the reaction tank has a membrane separation unit.

With this constitution, since the reaction tank has a membrane separation unit, the biological sludge and the chemical sludge can be prevented from flowing out of the reaction tank so that the biological sludge and the chemical sludge can be effectively used for waste water treatment.

Also, microorganisms contained in the biological sludge do not flow out of the reaction tank and therefore can be effectively used for waste water treatment.

Further, since neither the biological sludge nor the chemical sludge flow out of the reaction tank, continuously introducing the biological sludge and the chemical sludge to the reaction tank allows biological sludge concentration and chemical sludge concentration to be markedly increased, thus allowing the waste water treatment efficiency to be enhanced.

It is noted here that the membrane separation unit, in brief, is a unit for filtrating treatment water with a membrane so that treated water which does not contain suspended solids at all and which contains dissolved ionic substances can securely be obtained. The process of treating organic matter-containing fluorine waste water in the reaction tank into which calcium-containing chemical sludge and biological sludge are introduced and which has a membrane separation unit is a process of moving only ionic substances dissolved in the waste water into the treated water by the membrane separation unit. Therefore, minute microorganisms, suspended microorganisms and minute calcium fluoride as a reaction product stay on the concentrated side and do not move into the treated water.

Accordingly, unlike treated water obtained by conventional flocculation and settling, high degree of treatment with respect to suspended solids is enabled. That is, conventional methods by flocculation and settling could allow minute calcium fluoride to be contained in the treated water, resulting in degraded water quality.

Also, the membrane separation unit makes it possible to propagate far larger amounts of microorganisms on the concentrated side (within the reaction tank), than in the conventional case where those microorganisms are present in suspend state in the reaction tank and resultantly flow away therefrom in the prior-art flocculation and settling method, by allowing a small amount of useful microorganisms such as denitrifying bacteria for treating nitrate nitrogen to stay on the concentrated side (within the reaction tank). Therefore, it becomes possible to treat organic matters in the waste water more effectively by the large amount of microorganisms.

Further, when the biological sludge is continuously introduced to the reaction tank, where the membrane separation unit is provided, the microorganism concentration is markedly increased, allowing the treatment efficiency to be enhanced. Therefore, organic matter-containing fluorine waste water can be treated more effectively by the reaction tank having the membrane separation unit.

Without the presence of the membrane separation unit in the reaction tank, there would be some cases where chemical sludge flows out of the reaction tank, flowing into the succeeding slaked lime reaction tank, so that fluorine is re-dissolved from the once-formed chemical sludge, which degrades the water quality of the treated water.

In one embodiment of the present invention, the membrane separation unit is a submerged membrane.

With this constitution, since the membrane separation unit is a submerged membrane (membrane submerged in the liquid) and therefore can be placed under the water surface inside the reaction tank, there is no need of preparing any new location for the membrane separation unit. Also, because of the membrane separation unit being a submerged membrane, when the membrane surface is blocked, the blocked portion can be easily air-cleaned by air-cleaning the membrane surface.

In one embodiment of the present invention, the reaction tank has an aeration zone having the membrane separation unit, a biological sludge zone and a chemical sludge zone disposed from above to below in this order, and organic matter-containing fluorine waste water is introduced from lower part of the reaction tank for treatment.

With this constitution, the reaction tank comprises, from above to below, the aeration zone having the membrane separation unit, the biological sludge zone and the chemical sludge zone, and organic matter-containing fluorine waste water showing acidity is introduced from the reaction-tank lower part. Therefore, first, fluorine in the organic matter-containing fluorine waste water can be treated (primary treatment of fluorine) and, simultaneously therewith, the waste water can be neutralized.

Then, the organic matter-containing fluorine waste water that has been neutralized by the chemical sludge goes up from the lower chemical sludge zone so as to be introduced to the biological sludge zone. In this biological sludge zone, the organic matters in the waste water are biologically treated by the microorganisms contained in the biological sludge.

Next, the waste water is introduced to the uppermost aeration zone, where the organic matters in the waste water are biologically treated by aerobic microorganisms propagating in the aeration zone. This aeration zone, because of being aerated, maintains aerobic and aerobic microorganisms are propagating. Also, since the membrane separation unit is provided at this aeration zone, the aerobic microorganisms are absolutely prevented from flowing out of the aeration zone. Still more, by the provision of the membrane separation unit, aerobic microorganisms are concentrated so that the treatment efficiency of microbial treatment by the aerobic property can be enhanced.

With respect to the specific gravities of sludge in the aeration zone, sludge in the biological sludge zone and sludge in the chemical sludge zone, their ranking, from lightest to heaviest, is the sludge of the aeration zone, the sludge of the biological sludge zone and the sludge of the chemical sludge zone, where the heavy chemical sludge containing flocculants comes to the lowermost part.

In one embodiment of the present invention, return sludge containing unreacted chemicals and derived from the settling tank is introduced to the chemical sludge zone of the reaction tank.

With this constitution, since return sludge from the settling tank containing unreacted chemicals is introduced to the chemical sludge zone of the reaction tank, sludge containing the unreacted chemicals can be recycled while the unreacted chemicals can be prevented from forming sludge as a waste material.

In one embodiment of the present invention, the reaction tank has a settling part communicating with its chemical sludge zone, and sludge of the settling part is introduced to a concentration tank, concentrated there, and thereafter dehydrated.

With this constitution, since the settling part is provided so as to communicate with the chemical sludge zone of the reaction tank, reaction product (calcium fluoride) after the reaction at the chemical sludge zone can be moved to the settling part. Also, since sludge of the settling part, which is the reaction product, is introduced to the concentration tank and concentrated there and thereafter dehydrated, the reaction products can be disposed of as dehydrated cake.

It is noted that the step of pulling out sludge from the settling part into the concentration tank and then dehydrating the sludge is not included in conventional waste water treatment methods, whereas the sludge would conventionally be pulled out from the settling tank to the concentration tank. Therefore, the quantity of sludge generation can be reduced and the running cost can be reduced. That is, resources can be put into effective use.

In one embodiment of the present invention, organic matters of the organic matter-containing fluorine waste water are organic matters derived from IPA or acetone and surface-active agents.

With this constitution, since nitrate nitrogen is contained in fluorine waste water in semiconductor factories, IPA (isopropyl alcohol) or acetone or surface-active agents can be utilized as a hydrogen donor in denitrifying the nitrate nitrogen. That is, denitrification can be performed without adding new organic matters such as methanol to the waste water containing nitrate nitrogen, so that the running cost can be reduced.

In one embodiment of the present invention, the submerged membrane is an ultrafiltration membrane or a microfiltration membrane.

With this constitution, since the submerged membrane is an ultrafiltration membrane or a microfiltration membrane, filtrations on the micron order can be achieved, so that filtered water containing no SS (suspended solids) can be ensured and moreover the biological sludge and the chemical sludge can be concentrated in the reaction tank. Therefore, in the case where resin treatment or the like is planned in later stages, there never occurs deposition of suspended solids onto the resin surface, hence there never occurs reduction in treating effect by resins, thus fully eliminating any effects of suspended solids. That is, according to the present invention, reliable pre-treatment for later stages of resins or the like is enabled, so that the later treatment can be ensured.

In one embodiment of the present invention, the biological sludge zone comprises concentrated biological sludge and the chemical sludge zone comprises concentrated chemical sludge.

With this constitution, the biological sludge zone comprises concentrated biological sludge and the chemical sludge zone comprises concentrated chemical sludge. Therefore, because of being concentrated sludge, the biological sludge is increased in its denitrifying and organic matter-decomposing properties. Also, because the biological sludge is concentrated, the biological sludge zone becomes more anaerobic. Further, because of being concentrated sludge, chemical sludge is increased in its reactivity. Moreover, because the sludge concentration is high, waste water can be prevented from passing short in the passage through the chemical sludge zone. Therefore, there can be obtained an effect that more stable treatment can be achieved.

In one embodiment of the present invention, the reaction tank has a partitioning wall between the aeration zone and the biological sludge zone.

With this constitution, since the reaction tank has a partitioning wall between the aeration zone and the biological sludge zone, the zones can be isolated from each other so that the aeration zone can be maintained more aerobic and that the biological sludge zone can be maintained more anaerobic. That is, the partitioning wall makes it less likely to occur that the sludge in the aeration zone is moved to the biological sludge zone by water flow.

Also, there is provided a waste water treatment apparatus comprising:

a reaction tank which is made up of an aeration zone having a membrane separation unit, a biological sludge zone and a chemical sludge zone communicating with a settling part, and to which chemical sludge and biological sludge are introduced;

a slaked lime reaction tank (14) into which slaked lime is added;

a polychlorinated aluminum flocculation tank (16) into which polychlorinated aluminum is added;

a polymer-flocculant flocculation tank (17) into which a polymer flocculant is added; and a settling tank for performing solid-liquid separation, wherein organic matter-containing fluorine waste water is introduced sequentially to these tanks and thereby treated.

With this constitution, fluorine is treated first in the chemical sludge zone, and next treated in the slaked lime reaction tank into calcium fluoride. Further, the calcium fluoride as a reaction product is flocculated in the polychlorinated aluminum flocculation tank and the polymer-flocculant flocculation tank, and moreover calcium fluoride and supernatant are settled and separated from each other in the settling tank. As a result of this, fluorine is treated.

Also, organic matters are firstly decomposed by anaerobic microorganisms in the non-aerated biological sludge zone, and secondly decomposed by aerobic microorganisms in the aerated aeration zone.

Also, since the aeration zone has a membrane separation unit, the sludge concentration on the aeration zone side becomes high, allowing the reaction to proceed effectively.

Also, since the permeated water by the membrane separation unit does not contain suspended solids at all, there occur no obstacles due to suspended solids in subsequent reactions.

In one embodiment of the present invention, sludge settled in the settling tank is returned to the chemical sludge zone of the reaction tank.

With this constitution, since sludge settled in the settling tank is returned to the chemical sludge zone of the reaction tank, slaked lime and flocculants as unreacted chemicals contained in the sludge settled in the settling tank can be brought into contact reaction with the waste water in the chemical sludge zone of the reaction tank, and thus recycled. That is, chemicals expense can be saved and the running cost can be reduced, while the resources can be put into effective use at the same time.

In one embodiment of the present invention, part of treated water derived from the membrane separation unit is introduced to a resin tower so as to be treated there, and its resulting treated water and treated water derived from the settling tank are merged together and treated.

With this constitution, part of the treated water derived from the membrane separation unit is introduced to the resin tower and treated there, treated water having a fluorine concentration of 1 ppm or lower after the passage of the resin tower can easily be ensured. Meanwhile, when the target water quality for fluorine concentration is 1 ppm or more (e.g., 3 ppm), the target water quality can easily be maintained by merging the treated water that has passed through the resin tower with the treated water from the settling tank. In addition, since the waste water derived from the membrane separation unit contains no suspended solids, there never occurs deposition of suspended solids onto resins, thus making it easy to introduce to the resin tower and treat the waste water. As a result, water quality matching the target water-quality concentration can be ensured easily and with the running cost lowered.

In addition, in the prior art (e.g., Japanese Patent Publication No. 2503806), since the whole quantity of waste water is passed to the membrane separation unit and the adsorption tower, higher water quality than the target water quality would often result, causing the running cost such as regeneration of the adsorption tower to be increased.

In one embodiment of the present invention, part of treated water derived from the membrane separation unit is introduced to an ion exchange resin tower, treated there, and then merged with treated water derived from the settling tank and treated.

With this constitution, since part of treated water derived from the membrane separation unit is introduced to the ion exchange resin tower and treated there, treated water having a fluorine concentration of 1 ppm or lower after the passage through the ion exchange resin tower can easily be ensured. Meanwhile, when the target quality for fluorine concentration is 1 ppm or more (e.g., 3 ppm), target water quality can easily be maintained by merging the waste water that has passed through the ion exchange resin tower with the treated water derived from the settling tank. As a result, water quality matching the target water-quality concentration can be ensured easily and with the running cost lowered.

With this constitution, since part of the treated water from the membrane separation unit is introduced to the chelate resin tower which is capable of selectively treating fluorine, and treated there, treated water having a fluorine concentration of 1 ppm or less after passing through the chelate resin tower can easily be ensured. On the other hand, when the target water quality for fluorine is 1 ppm or more (e.g., 3 ppm), the target water quality can easily be maintained by merging the treated water that has passed through the chelate resin tower, with the treated water derived from the settling tank. Therefore, water quality matching the target water quality concentration can be ensured easily and with the running cost lowered.

It is noted that the chelate resin has a characteristic of being capable of selectively treating only fluorine from among various kinds of ions.

In one embodiment of the present invention, part of treated water derived from the membrane separation unit is introduced to an activated carbon tower, an ion exchange resin tower and a reverse osmosis membrane unit, treated there, and then introduced to an ultrapure water production system so as to be recycled.

With this constitution, since part of the treated water derived from the membrane separation unit is introduced to the activated carbon tower, the ion exchange resin tower and the reverse osmotic membrane unit and then treated there, the treated water becomes quite better in water quality so as to be recycled for ultrapure water production systems. Therefore, the waste water can be put into effective use, and becomes recyclable.

Also, there is provided a waste water treatment apparatus comprising:

a reaction tank which is made up of an aeration zone having a membrane separation unit, a biological sludge zone and a chemical sludge zone communicating with a settling part, and to which chemical sludge and biological sludge are introduced;

a slaked lime reaction tank into which slaked lime is added;

a polychlorinated aluminum flocculation tank into which polychlorinated aluminum is added;

a polymer-flocculant flocculation tank into which a polymer flocculant is added; and a membrane separation tank having a membrane separation unit for performing solid-liquid separation, wherein organic matter-containing fluorine waste water is introduced sequentially to these tanks and thereby treated.

With this constitution, since waste water treatment is performed with the membrane separation tank having the membrane separation unit in place of the settling tank, deterioration of water quality due to outflow of sludge, which could occur with the settling tank, can completely be prevented by the membrane separation unit. Therefore, treated water that does not contain suspended solids at all can be ensured.

Also, there is provided a waste water treatment apparatus comprising:

a reaction tank which is made up of an aeration zone having aerobic microorganisms propagated therein and having a membrane separation unit, a biological sludge zone having anaerobic microorganisms propagated therein, and a chemical sludge zone having calcium present therein and communicating with a settling part, and to which chemical sludge and biological sludge are introduced;

a slaked lime reaction tank (14) into which slaked lime is added;

a polychlorinated aluminum flocculation tank (16) into which polychlorinated aluminum is added;

a polymer-flocculant flocculation tank (17) into which a polymer flocculant is added; and a settling tank (19) for performing solid-liquid separation, wherein hydrogen-peroxide- and organic matter-containing fluorine waste water is introduced sequentially to these tanks and thereby treated.

With this constitution, hydrogen peroxide can be treated by the reducibility of anaerobic microorganisms propagated in the biological sludge zone. Hydrogen peroxide, which is an oxidizer, can generally be treated with reducing agents.

Also, organic matters can be treated by the biological sludge zone, where anaerobic microorganisms are propagated, and the aeration zone, which is an aeration zone having aeration means and where aerobic microorganisms are propagated. Also, fluorine can be treated by introducing the waste water sequentially to the chemical sludge zone with calcium present therein, the slaked lime reaction tank with slaked lime added thereto, the polychlorinated aluminum flocculation tank with polychlorinated aluminum added thereto, the polymer-flocculant flocculation tank with polymer flocculants added thereto, and the settling tank for performing solid-liquid separation.

That is, organic matters and hydrogen peroxide contained in the fluorine waste water are treated with one reaction tank and yet in a zone different from that of fluorine treatment. Therefore, there is no need for any exclusive reaction tank (hydrolysis tank) for treating hydrogen peroxide, allowing the initial cost to be reduced.

Also, hydrogen peroxide is not treated by chemicals as reducing agents or activated carbon as a catalyst, but by anaerobic microorganisms having reducibility and concentrated by the membrane separation unit, which treat hydrogen peroxide by taking organic matters as a nutrient source. Thus, the running cost can be reduced.

Also, there is provided a waste water treatment apparatus comprising:

a reaction tank which is made up of an aeration zone having aerobic microorganisms propagated therein and having a membrane separation unit, a biological sludge zone having anaerobic microorganisms propagated therein, and a chemical sludge zone having calcium present therein and communicating with a settling part, and to which chemical sludge and biological sludge are introduced;

a slaked lime reaction tank into which slaked lime is added;

a polychlorinated aluminum flocculation tank into which polychlorinated aluminum is added;

a polymer-flocculant flocculation tank into which a polymer flocculant is added; and a settling tank for performing solid-liquid separation, wherein nitrate-nitrogen- and organic matter-containing fluorine waste water is introduced sequentially to these tanks and thereby treated.

With this constitution, nitrate nitrogen can be reduced by anaerobic microorganisms as nitrogen gas. Also, organic matters can be treated in the biological sludge zone, where anaerobic microorganisms are propagated, and the aeration zone, which has aeration means and where aerobic microorganisms are propagated. Also, fluorine can be treated by introducing the waste water sequentially to the chemical sludge zone with calcium present therein, the slaked lime reaction tank with slaked lime added thereto, the polychlorinated aluminum flocculation tank with polychlorinated aluminum added thereto, the polymer-flocculant flocculation tank with polymer flocculants added thereto, and the settling tank for performing solid-liquid separation.

In this constitution, nitrate nitrogen in the waste water can be treated up to nitrogen gas by denitrifying bacteria (anaerobic microorganisms) of the biological sludge zone, with organic matters in the waste water utilized as a hydrogen donor.

That is, organic matters and nitrate nitrogen contained in the fluorine waste water are treated with one reaction tank and yet in a zone different from that of fluorine treatment. Therefore, there is no need for any exclusive reaction tanks (aeration tank or denitrification tank) for treating organic matters or nitrate nitrogen, allowing the initial cost to be reduced. Further, anaerobic microorganisms utilize the organic matters in the waste water as a hydrogen donor, and anaerobic microorganisms (denitrifying bacteria) concentrated by the membrane separation unit treat the nitrate nitrogen. Therefore, the running cost can be reduced, as compared with methods in which new methanol as a chemical is added to the denitrification tank as in the prior art.

Also, there is provided a waste water treatment apparatus comprising:

a reaction tank which is made up of an aeration zone having aerobic microorganisms propagated therein and having a membrane separation unit, a biological sludge zone having anaerobic microorganisms propagated therein, and a chemical sludge zone having calcium present therein and communicating with a settling part, and to which chemical sludge and biological sludge are introduced;

a slaked lime reaction tank into which slaked lime is added;

a polychlorinated aluminum flocculation tank into which polychlorinated aluminum is added;

a polymer-flocculant flocculation tank into which a polymer flocculant is added; and a settling tank for performing solid-liquid separation, wherein hydrogen-peroxide-, nitrate-nitrogen- and organic matter-containing fluorine waste water is introduced sequentially to these tanks and thereby treated.

With this constitution, hydrogen peroxide can be treated by the reducibility of anaerobic microorganisms propagated in the biological sludge zone, and nitrate nitrogen can be reductively treated by anaerobic microorganisms as nitrogen gas.

Also, organic matters can be treated in the biological sludge zone, where anaerobic microorganisms are propagated, and the aeration zone, which has aeration means and where aerobic microorganisms are propagated. Further, fluorine can be treated by introducing the waste water sequentially to the chemical sludge zone with calcium present therein, the slaked lime reaction tank with slaked lime added thereto, the polychlorinated aluminum flocculation tank with polychlorinated aluminum added thereto, the polymer-flocculant flocculation tank with polymer flocculants added thereto, and the settling tank for performing solid-liquid separation.

That is, hydrogen peroxide, organic matters and nitrate nitrogen contained in the fluorine waste water are treated with one reaction tank and yet in a zone different from that of fluorine treatment. Therefore, there is no need for any exclusive reaction tanks (hydrolysis tank, aeration tank, denitrification tank) for treating hydrogen peroxide, organic matters and nitrate nitrogen, allowing the initial cost to be reduced.

That is, hydrogen peroxide is treated not by chemicals as reducing agents or activated carbon as a catalyst, but by anaerobic microorganisms having reducibility and concentrated by the membrane separation unit, which treat hydrogen peroxide by utilizing organic matters. Thus, the running cost can be reduced. Also, the anaerobic microorganisms concentrated by the membrane separation unit take the organic matters in the waste water as a hydrogen donor, and the anaerobic microorganisms (denitrifying bacteria) treat nitrate nitrogen. Thus, the running cost can be reduced, as compared with methods in which new methanol as a chemical is added to the denitrification tank as in the prior art.

Also, there is provided a waste water treatment apparatus comprising:

a reaction tank which is made up of an aeration zone having aerobic microorganisms propagated therein and having a membrane separation unit, a biological sludge zone having anaerobic microorganisms propagated therein, and a chemical sludge zone having calcium present therein and communicating with a settling part, and to which chemical sludge and biological sludge are introduced;

a slaked lime reaction tank into which slaked lime is added;

a polychlorinated aluminum flocculation tank into which polychlorinated aluminum is added;

a polymer-flocculant flocculation tank into which a polymer flocculant is added; and a settling tank for performing solid-liquid separation, wherein hydrogen-peroxide-, nitrate-nitrogen- and organic matter-containing fluorine waste water and silicon waste water are introduced sequentially to these tanks and thereby treated.

With this constitution, hydrogen peroxide can be treated by the reducibility of anaerobic microorganisms propagated in the biological sludge zone, nitrate nitrogen can be reductively treated by anaerobic microorganisms as nitrogen gas, and organic matters can be treated in the biological sludge zone, where anaerobic microorganisms are propagated, and the aeration zone, which has aeration means and where aerobic microorganisms are propagated.

Further, fluorine can be treated by introducing the waste water sequentially to the chemical sludge zone with calcium present therein, the slaked lime reaction tank with slaked lime added thereto, the polychlorinated aluminum flocculation tank with polychlorinated aluminum added thereto, the polymer-flocculant flocculation tank with polymer flocculants added thereto, and the settling tank for performing solid-liquid separation.

Also, silicon in the silicon waste water can be treated by physical filtration with the membrane separation unit.

Therefore, there is no need for any exclusive reaction tanks (hydrolysis tank, aeration tank, denitrification tank, silicon reaction tank) for treating hydrogen peroxide, organic matters, nitrate nitrogen and silicon, allowing the initial cost to be reduced.

hydrogen peroxide is treated by utilizing organic matters, therefore the running cost can be reduced.

Therefore, the running cost can be reduced, as compared with methods in which new methanol as a chemical is added to the denitrification tank as in the prior art. Also, silicon particles in the silicon waste water are treated by the membrane separation unit and chemical sludge, the treatment can be achieved without adding any new flocculants. Thus, the running cost can be reduced.

Also, there is provided a waste water treatment apparatus comprising:

a reaction tank which is made up of an aeration zone having aerobic microorganisms propagated therein and having a membrane separation unit, a biological sludge zone having anaerobic microorganisms propagated therein, and a chemical sludge zone having calcium present therein and communicating with a settling part, and to which chemical sludge and biological sludge are introduced;

a slaked lime reaction tank into which slaked lime is added;

a polychlorinated aluminum flocculation tank into which polychlorinated aluminum is added;

a polymer-flocculant flocculation tank into which a polymer flocculant is added; and a settling tank for performing solid-liquid separation, wherein hydrogen-peroxide-, nitrate-nitrogen- and organic matter-containing fluorine waste water and silicon waste water, and organochlorine-compound-containing underground water are introduced sequentially to these tanks and thereby treated.

With this constitution, hydrogen peroxide can be treated by the reducibility of anaerobic microorganisms propagated in the biological sludge zone, nitrate nitrogen can be reductively treated by anaerobic microorganisms as nitrogen gas. Also, organic matters can be treated in the biological sludge zone, where anaerobic microorganisms are propagated, and the aeration zone, which has aeration means and where aerobic microorganisms are propagated. Further, fluorine can be treated by introducing the waste water sequentially to the chemical sludge zone with calcium present therein, the slaked lime reaction tank with slaked lime added thereto, the polychlorinated aluminum flocculation tank with polychlorinated aluminum added thereto, the polymer-flocculant flocculation tank with polymer flocculants added thereto, and the settling tank for performing solid-liquid separation.

Also, silicon in the silicon waste water can be treated by physical filtration with the membrane separation unit, and organochlorine compounds can be treated by the dechlorinating action of silicon.

Therefore, there is no need for any exclusive reaction tanks (hydrolysis tank, aeration tank, denitrification tank, silicon reaction tank, organochlorine-compound reaction tank) for treating hydrogen peroxide, organic matters, nitrate nitrogen, silicon and organochlorine compounds, allowing the initial cost to be reduced.

That is, hydrogen peroxide is treated not by chemicals as reducing agents or activated carbon as a catalyst, but by anaerobic microorganisms having reducibility and concentrated by the membrane separation unit, where the anaerobic microorganisms treat hydrogen peroxide by utilizing the organic matters. Thus, the running cost can be reduced.

Also, anaerobic microorganisms takes the organic matters in the waste water as a hydrogen donor, and these anaerobic microorganisms (denitrifying bacteria) treat nitrate nitrogen. Thus, the running cost can be reduced, as compared with methods in which new methanol as a chemical is added to the denitrification tank as in the prior art.

Also, since silicon in the silicon waste water is treated by the membrane separation unit and chemical sludge, silicon can be treated without adding any new flocculants, allowing the running cost to be reduced. Further, underground water containing organochlorine compounds is mixed with silicon sludge concentrated by the membrane separation unit, so that organochlorine compounds are treated by the dechlorinating reaction of the silicon sludge. Thus, the running cost can be reduced.

Also, there is provided a waste water treatment method comprising a step of:

treating fluorine waste water in a reaction tank into which calcium-containing chemical sludge is introduced and which has a membrane separation unit.

With this constitution, fluorine can be treated as calcium fluoride through reaction with calcium contained in the chemical sludge, and further physically separated into calcium fluoride as a solid and treated water by the membrane separation unit. Fluorine waste water is treated by chemical sludge without using any new chemicals, therefore the running cost can be reduced.

Also, there is provided a waste water treatment apparatus comprising:

a reaction tank into which calcium-containing chemical sludge is introduced and which has a membrane separation unit;

a slaked lime reaction tank into which slaked lime is added;

a polychlorinated aluminum flocculation tank into which polychlorinated aluminum is added;

a polymer-flocculant flocculation tank into which a polymer flocculant is added; and a settling tank for performing solid-liquid separation, wherein fluorine waste water is introduced sequentially to these tanks and thereby treated.

With this constitution, firstly, fluorine can be treated as calcium fluoride through reaction with calcium contained in the chemical sludge present in the reaction tank, and further physically separated into calcium fluoride as a solid and treated water by the membrane separation unit present in the reaction tank.

Then, secondly, fluorine in the treated water can be treated by introducing the treated water sequentially to the slaked lime reaction tank with slaked lime added thereto, the polychlorinated aluminum flocculation tank with polychlorinated aluminum added thereto, the polymer-flocculant flocculation tank with polymer flocculants added thereto, and the settling tank for performing solid-liquid separation. Since fluorine waste water is treated by chemical sludge without using any new chemicals, the running cost can be reduced.

Further, after the treatment with the addition of slaked lime and flocculants, solid-liquid separation is performed. Thus, the fluorine concentration in the treated water can be suppressed low.

Also, there is provided a waste water treatment apparatus comprising:

a reaction tank into which calcium-containing chemical sludge is introduced and which has a first membrane separation unit;

a slaked lime reaction tank into which slaked lime is added;

a polychlorinated aluminum flocculation tank into which polychlorinated aluminum is added;

a polymer-flocculant flocculation tank into which a polymer flocculant is added; and a membrane separation tank having a second membrane separation unit, wherein fluorine waste water is introduced sequentially to these tanks and thereby treated.

With this constitution, firstly, fluorine in the waste water can be treated as calcium fluoride through reaction with calcium contained in the chemical sludge, and further physically separated into calcium fluoride as a solid and treated water by the membrane separation unit.

Then, secondly, fluorine in the treated water can be treated by introducing the treated water sequentially to the slaked lime reaction tank with slaked lime added thereto, the polychlorinated aluminum flocculation tank with polychlorinated aluminum added thereto, and the polymer-flocculant flocculation tank with polymer flocculants added thereto, and thirdly, by introducing the treated water to the membrane separation tank having the membrane separation unit.

That is, in the waste water treatment apparatus of another embodiment, calcium-containing chemical sludge is concentrated by the membrane separation unit to high concentration, and the fluorine waste water is passed therethrough and thereby treated. Thus, fluorine treatment can be executed efficiently.

Further, since fluorine waste water is treated by chemical sludge without using any new chemicals, the running cost can be reduced. Furthermore, after the treatment with the addition of slaked lime and flocculants, the waste water is treated in the membrane separation tank having a second membrane separation unit. Therefore, deterioration of water quality due to outflow of sludge can completely be prevented, so that the fluorine concentration in the treated water can be suppressed low stably.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a constitutional diagram showing a first embodiment of the waste water treatment apparatus according to the present invention;

FIG. 2A is a timing chart showing processing time at each treatment tank of the first embodiment with normal concentration, FIG. 2B is a timing chart showing processing time at each treatment tank of the first embodiment with low concentration;

FIG. 5 is a constitutional diagram showing a fourth embodiment of the waste water treatment apparatus according to the present invention;

FIG. 6A is a timing chart showing processing time at each treatment tank of the fourth embodiment with normal concentration, FIG. 6B is a timing chart showing processing time at each treatment tank of the fourth embodiment with low concentration;

FIG. 7 is a constitutional diagram showing a fifth embodiment of the waste water treatment apparatus according to the present invention;

DETAILED DESCRIPTION OF THE PREFERRED EMBODIMENTS

Figure 3:
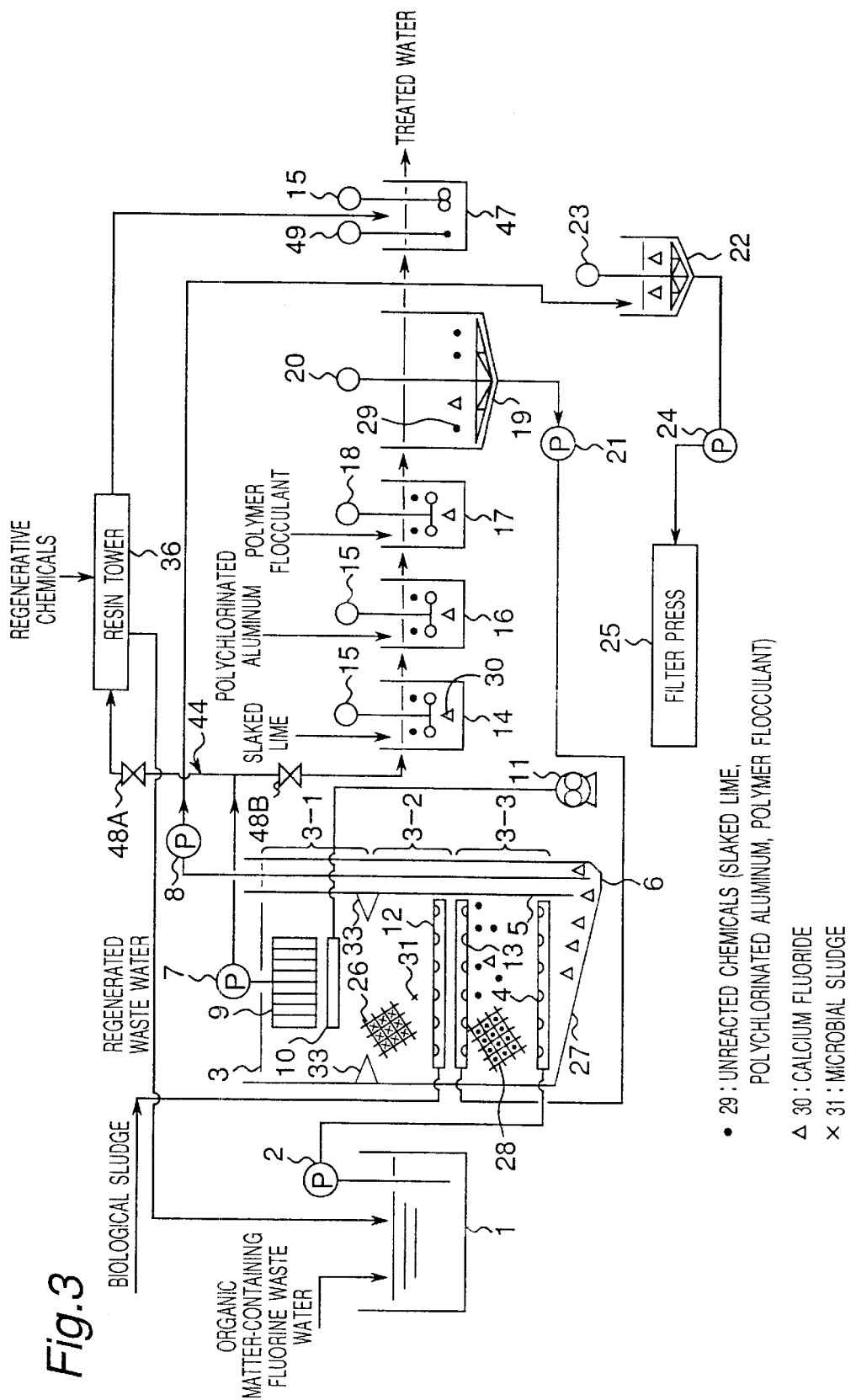
FIG. 3 is a constitutional diagram showing a second embodiment of the waste water treatment apparatus according to the present invention.

Hereinbelow, the present invention is described in detail by way of embodiments thereof illustrated in the accompanying drawings.

(First Embodiment)

FIG. 1 shows a first embodiment of the waste water treatment apparatus according to the present invention. In this first embodiment, organic matter-containing fluorine waste water is introduced to a raw water tank (first water tank) 1. Then, the waste water is introduced by a raw water tank pump 2 to lower part of a chemical-sludge-zone/biological-sludge-zone reaction tank (second water tank) 3 having a submerged membrane, and treated at the reaction tank 3. Subsequently, the waste water is introduced to a slaked lime reaction tank (third water tank) 14, a polychlorinated aluminum flocculation tank (fourth water tank) 16, a polymer-flocculant flocculation tank (fifth water tank) 17, and a settling tank 19, by which the waste water is treated.

Also, sludge generated at a settling part 6 of the reaction tank 3 and containing no unreacted chemicals 29 is introduced to a concentration tank 22, and dehydrated by a filter press 25.

Also, biological sludge generated from other waste water treatment equipment, i.e. microbial sludge 31, is introduced through a biological sludge inlet pipe 12 set in lower part of a reaction-tank intermediate portion (biological sludge zone) 3-2 of the reaction tank 3, and used for treatment.

A further detailed description of FIG. 1 is given below.

Organic matter-containing fluorine waste water is introduced to the raw water tank 1. The organic matter-containing fluorine waste water introduced to the raw water tank 1 is made to flow out upward of the reaction tank 3 through the lower-part inflow pipe 4 set in lower part of the reaction tank 3. The reaction tank 3 is made up of an upper-positioned reaction-tank upper part (aeration zone) 3-1, an intermediate-positioned reaction-tank intermediate part (biological sludge zone) 3-2 and a lower-positioned reaction-tank lower part (chemical sludge zone) 3-3. In the upper-positioned reaction-tank upper part 3-1, a submerged membrane 9 connected to a submerged membrane pump 7 is set to thereby filter the waste water. By the filtration, the waste water is physically separated into a filtrate and a concentrate.

Also, a partitioning wall 33 is placed between the upper-positioned reaction-tank upper part (aeration zone) 3-1 and the intermediate-positioned reaction-tank intermediate part (biological sludge zone) 3-2. This partitioning wall 33 is tapered so as to be projected horizontally to a specified length. The partitioning wall 33 plays a role of restricting the convection of waste water between the aeration zone 3-1 and the biological sludge zone 3-2, thereby clarifying the separation between the aerobic state of the aeration zone 3-1 and the anaerobic state of the biological sludge zone 3-2.

Also, in the reaction-tank lower part (chemical sludge zone) 3-3, a large amount of return sludge from the settling tank 19 showing an alkalinity of a pH value of about 8.0–8.5 flows into the reaction-tank lower part 3-3 through a chemical sludge inlet pipe 13 set at upper part of the reaction-tank lower part 3-3. Then, because of a long retention time and by the submerged membrane 9 set at the reaction-tank upper part 3-1, the intermediate-positioned biological sludge zone 3-2 has therein concentrated biological sludge 26. Further, the lower-positioned chemical sludge zone 3-3 has come to a state of concentrated chemical sludge 28. In this lower-positioned chemical sludge zone 3-3, there is no agitation means such as an agitator or aeration means by an air diffuser, so that the chemical sludge results in a highly concentrated state, naturally.

Meanwhile, return sludge from the settling tank 19 to the lower-positioned chemical sludge zone 3-3 is sludge containing unreacted chemicals 29. Reasons why the return sludge is sludge containing the unreacted chemicals 29 are that convection time is short in the slaked lime reaction tank 14, the polychlorinated aluminum flocculation tank 16 and the polymer-flocculant flocculation tank 17 due to reaction and flocculation states in each tank, and that excessive amounts of chemicals are added. It is noted that return sludge from the settling tank 19 to the chemical sludge zone 3-3 shows an alkalescent pH value of about 8.0–8.5. This sludge showing an alkalescent pH value of about 8.0–8.5 contains unreacted slaked lime, unreacted polychlorinated aluminum or unreacted polymer flocculants.

Meanwhile, acidic organic matter-containing fluorine waste water having a pH value of 2–3 introduced from the raw water tank 1 to the chemical sludge zone 3-3 causes calcium or other components of the concentrated chemical sludge 28 to be dissolved while the organic matter-containing fluorine waste water itself is gradually neutralized by alkali components. If 2 hours or more is selected as the retention time of the organic matter-containing fluorine waste water in the chemical sludge zone 3-3, it becomes possible to obtain waste water being alkalescent to neutral, i.e. having a pH ranging from 5 to 7. It is noted that the SS (suspended solid) concentration in the chemical sludge zone 3-3 at the lower part of the reaction tank 3 is preferably around 30,000 ppm, but it is not indispensable.

The sludge containing the unreacted chemicals 29 from the settling tank 19 to the chemical sludge zone 3-3 flows through the chemical sludge inlet pipe 13 placed at upper part of the chemical sludge zone 3-3, reacting with components such as, typically, fluorine in the acidic organic matter-containing fluorine waste water (primary treatment). A typical reaction is the formation of calcium fluoride 30 by a reaction of fluorine in the waste water and calcium in the unreacted chemicals 29. The sludge flowing through the chemical sludge inlet pipe 13 into the chemical sludge zone 3-3 reacts with the organic matter-containing fluorine waste water that has flowed through the lower-part inflow pipe 4 placed at the lower part of the chemical sludge zone 3-3, and then the unreacted chemicals are consumed. Therefore, the sludge after the reaction moves while gradually settling down, and passes through upper part of an inclined wall 27 placed at the lowermost part, thus moving to the settling part 6.

In order that the sludge moved to the settling part 6 does not contain the unreacted chemicals 29, there is a need of controlling the inlet quantity of organic matter-containing fluorine waste water into the reaction tank 3 and the inlet quantity of return sludge from the settling tank 19 to the reaction tank 3. That is, by controlling the inlet quantity of organic matter-containing fluorine waste water into the reaction tank 3 and the inlet quantity of return sludge from the settling tank 19 so that the sludge transferred from a settling part pump 8 to the concentration tank (seventh tank) 22 comes to have a neutral to alkalescent value of pH (more specifically, a pH value of not more than 7), sludge that does not contain the unreacted chemicals 29 can be obtained in the settling part 6.

In this way, the sludge in the settling part 6 becomes sludge of the calcium fluoride 30 that does not contain unreacted chemicals, and then is transferred from the settling part pump 8 to the concentration tank 22.

Next, the waste water, in which fluorine in the organic matter-containing fluorine waste water has been primarily treated by the concentrated chemical sludge 28 of the reaction-tank lower part 3-3 and thus which has been neutralized to some extent, flows into the reaction-tank intermediate part 3-2. That is, the organic mattercontaining fluorine waste water having a pH value of 5–7 goes up, flowing into the reaction-tank intermediate part 3-2. In the reaction-tank intermediate part 3-2, biological sludge generated by other waste water treatment equipment has flowed in, forming concentrated biological sludge 26. The reasons why biological sludge is concentrated in this intermediate part 3-2 are that no agitation means is present in the reaction-tank intermediate part 3-2 and that the submerged membrane 9 as a membrane separation unit is placed in the reaction-tank upper part 3-1 so that filtrated water only is discharged.

This concentrated biological sludge 26, as a result of consumption of oxygen in the organic matter-containing fluorine waste water by most of microorganisms, has become anaerobic. Then, these anaerobic microorganisms are propagating by taking the organic matters in the waste water as a matrix (nutrient source). In this way, the organic matters in the waste water are primarily treated by anaerobic microorganisms.

It is noted that the SS (suspended solid) concentration at the intermediate part (biological sludge zone) 3-2 of the reaction tank 3 is preferably around 20,000 ppm, but it is not indispensable.

As described above, the concentrated biological sludge 26 is formed due to the facts that biological sludge flows into the reaction-tank intermediate part 3-2 and that the submerged membrane 9 as a membrane separation unit is set in the aeration zone 3-1 so that the waste water is filtrated. Therefore, the waste water containing fluorine-treated organic matters that has flowed into the reaction-tank intermediate part 3-2 is biologically treated by the microbial sludge 31 composed of, primarily, anaerobic microorganisms in the concentrated biological sludge 26, so with the result that the organic matter concentration is lowered.

In the reaction-tank intermediate part 3-2, because of not only the absence of any aeration means but also a high concentration of biological sludge, anaerobic microorganisms are propagating.

As described above, the partitioning wall 33 is set between the reaction-tank intermediate part 3-2 and the reaction-tank upper part 3-1. This partitioning wall 33 is a wall provided so that the heavy concentrated biological sludge 26 does not move to the reaction-tank upper part 3-1. That is, the partitioning wall 33 is enabled to prevent the circulating water flow of the reaction-tank upper part 3-1 from affecting the reaction-tank intermediate part 3-2. Because of a high sludge concentration of the circulating water flow of the reaction-tank upper part 3-1 and a high sludge concentration of the reaction-tank intermediate part 3-2, a partitioning wall 33 having a projected configuration as in the first embodiment would be able to exert the necessary separating function.

More specifically, when dimensions of the reaction-tank upper part 3-1 and the reaction-tank intermediate part 3-2 are about 1 m (meter) wide, 1 m deep and 2 m high in their total, a projection size of about 0.1 m of the partitioning wall 33 into the tank is enough to serve for the necessary separating function. That is, the projection size of the partitioning wall 33, varying more or less depending on the sizes of the reaction-tank upper part 3-1 and the reaction-tank intermediate part 3-2, may appropriately be about 10% of width and depth of the reaction-tank upper part 3-1 and the reaction-tank intermediate part 3-2.

Next, at the reaction-tank intermediate part 3-2, organic matters in the waste water are treated by the concentrated biological sludge 26 (primary treatment of organic matters), which is anaerobic microorganisms, and then flows into the reaction-tank upper part 3-1. At this reaction-tank upper part 3-1, the waste water is in an aerobic state and the organic matters in the waste water are biologically treated primarily by aerobic microorganisms (secondary treatment of organic matters).

As described above, the submerged membrane 9 serving as a membrane separation unit is set at the reaction-tank upper part 3-1. Also, an air diffusing pipe 10 for air-cleaning the submerged membrane 9 is provided below the submerged membrane 9 so that the submerged membrane 9 is normally air-cleaned by air discharged through the air diffusing pipe 10 while the interior of the reaction-tank upper part 3-1 is aerated and keep aerobic.

It is noted that the air diffusing pipe 10 is connected to a blower 11 by piping. A common Roots blower is selected as this blower 11. Also, a microfiltration membrane or an ultrafiltration membrane may appropriately be selected as the submerged membrane 9. This microfiltration membrane is typified by a hollow fiber membrane made by Mitsubishi Rayon Co., Ltd., and the ultrafiltration membrane is typified by a flat membrane made by Kubota Ltd. This ultrafiltration membrane is capable of removing all fine particles and all microorganisms such as, bacteria and virus in the waste water as well as even part of dissolved organic matters in colloid regions. Also, the microfiltration membrane is capable of removing all of fine particles and bacteria in the waste water as well as part of virus and even part of dissolved organic matters in colloid regions.

It is noted that the SS (suspended solid) concentration at the upper part 3-1 of the reaction tank 3 is preferably around 10,000 ppm, but it is not indispensable.

It is appropriate to control the water quantity of inflow water so that the retention times for the reaction-tank lower part 3-3, the reaction-tank intermediate part 3-2 and the reaction-tank upper part 3-1 become each 2 hours, totally about 6 hours, in the case where the concentration of the organic matter-containing fluorine waste water is of normal concentration (100–300 ppm as fluorine concentration).

Next, fluorine in the waste water is primarily treated, and the waste water the organic matters of which have been primarily and secondarily treated is filtrated by the submerged membrane 9 set at the reaction-tank upper part 3-1. The filtrated waste water is transferred to the slaked lime reaction tank 14 by the submerged membrane pump 7 connected to the submerged membrane 9 with piping. A rapid agitator 15 is set at this slaked lime reaction tank 14, where new slaked lime is added and agitated so as to react with fluorine in the waste water that has not completely reacted in the reaction tank 3, thus making the fluorine secondarily treated. That is, with respect to fluorine in the waste water, the reaction at the reaction-tank lower part 3-3 is primary coarse treatment and the reaction at the slaked lime reaction tank 14 is reliable secondary treatment of fluorine.

In this slaked lime reaction tank 14, fluorine remaining in the waste water is formed into granular calcium fluoride by the addition of slaked lime and the agitation with the rapid agitator 15. Subsequently, the waste water is introduced into the polychlorinated aluminum flocculation tank 16, where polychlorinated aluminum as an inorganic flocculant is added, forming larger flocs. Then, the waste water containing the flocs is subsequently introduced into the polymer-flocculant flocculation tank 17, where a slow agitator 18 is set, and where the large flocs are formed into more stable, easy-to-settle even larger flocs by the addition of polymer flocculants. These more stable, easy-to-settle even larger flocs subsequently flow into the settling tank 19 having a settling-tank collector 20, where the flocs are settled to lower part of the settling tank 19. The resulting supernatant in this settling tank 19 is treated water.

The flocs, or sludge, settled in the settling tank 19 contains unreacted slaked lime, unreacted polychlorinated aluminum and unreacted polymer flocculants, due to the fact that slaked lime is added, polychlorinated aluminum is excessively added and polymer flocculants are added in the slaked lime reaction tank 14, the polychlorinated aluminum flocculation tank 16 and the polymer-flocculant flocculation tank 17. All the sludge settled in this settling tank 19 is returned to upper part of the reaction-tank lower part 3-3 by a sludge return pump 21.

As a result, the unreacted chemicals 29 are fully recycled for the treatment of organic matter-containing fluorine waste water, so that the sludge of the reaction-tank lower part 3-3 is settled, passing through the upper part of the inclined wall 27 and moving to the settling part 6. This sludge of the settling part 6 is transferred to the concentration tank 22 by the settling part pump 8, concentrated there, and then transferred to the filter press 25 by a filter press pump 24 and then dehydrated there.

According to this embodiment, since the biological sludge 31 and the calcium-containing chemical sludge 28 are introduced to one reaction tank 3, organic matters in the waste water can be treated by microorganisms contained in the biological sludge 31 and fluorine can be treated by the calcium-containing chemical sludge 28.

Also according to this embodiment, since the reaction tank 3 has the submerged membrane 9 as a membrane separation unit, the biological sludge 31 and the chemical sludge 28 can be prevented from flowing out of the reaction tank 3 so that the biological sludge 31 and the chemical sludge 28 can be effectively used for waste water treatment. Also, microorganisms contained in the biological sludge 31 do not flow out of the reaction tank 3 and therefore can be effectively used for waste water treatment. Further, since neither the biological sludge 31 nor the chemical sludge 28 flow out of the reaction tank 3, continuously introducing the biological sludge 31 and the chemical sludge 28 to the reaction tank 3 allows biological sludge concentration and chemical sludge concentration to be markedly increased, thus allowing the waste water treatment efficiency to be enhanced.

Also according to this embodiment, the reaction tank 3 comprises the aeration zone 3-1 having the membrane separation unit 9, the biological sludge zone 3-2 and the chemical sludge zone 3-3, and organic matter-containing fluorine waste water showing acidity is introduced from the reaction-tank lower part. Therefore, first, fluorine in the organic matter-containing fluorine waste water can be treated (primary treatment of fluorine) and, simultaneously therewith, the waste water can be neutralized. Then, the organic matter-containing fluorine waste water that has been neutralized by the chemical sludge 28 goes up from the lower chemical sludge zone 3-3 so as to be introduced to the biological sludge zone 3-2. In this biological sludge zone 3-2, the organic matters in the waste water are biologically treated by the microorganisms contained in the biological sludge 31. Next, the waste water is introduced to the uppermost aeration zone 3-1, where the organic matters in the waste water are biologically treated by aerobic microorganisms propagating in the aeration zone 3-1. This aeration zone 3-1, because of being aerated, maintains aerobic and aerobic microorganisms are propagating. Also, since the submerged membrane 9 is provided at this aeration zone 3-1, the aerobic microorganisms are absolutely prevented from flowing out of the aeration zone 3-1. Still more, by the provision of the submerged membrane 9, aerobic microorganisms are concentrated so that the treatment efficiency of microbial treatment by the aerobic property can be enhanced.

Further according to this embodiment, since return sludge from the settling tank 19 containing unreacted chemicals is introduced to the chemical sludge zone 3-3 of the reaction tank 3, sludge containing the unreacted chemicals 29 can be recycled while the unreacted chemicals 29 can be prevented from forming sludge as a waste material.

Further according to this embodiment, since the settling part 6 is provided so as to communicate with the chemical sludge zone 3-3 of the reaction tank 3, reaction products (calcium fluoride) after the reaction at the chemical sludge zone 3-3 can be moved to the settling part 6. Also, since sludge of the settling part 6, which is the reaction products, is introduced to the concentration tank 22 and concentrated there and thereafter dehydrated, the reaction products can be disposed of as dehydrated cake. It is noted that the step of pulling out sludge from the settling part 6 into the concentration tank 22 and then dehydrating the sludge is not included in conventional waste water treatment methods, whereas the sludge would conventionally be pulled out from the settling tank to the concentration tank.

In addition, FIG. 2A shows a processing timing chart for the individual tanks in the case where both organic matter concentration and fluorine concentration in the organic matter-containing fluorine waste water are normal concentrations, and FIG. 2B shows a processing timing chart for the individual tanks in the case where organic matter concentration and fluorine concentration in the organic matter-containing fluorine waste water are low concentrations.

(Second Embodiment)

Next, FIG. 3 shows a second embodiment of the waste water treatment apparatus according to the present invention. This second embodiment differs from the foregoing first embodiment only in the following point (i). Therefore, the same constituent parts as in the first embodiment are designated by the same reference numerals and their detailed description is omitted:

(i) It has been arranged in FIG. 1 that the whole quantity of waste water derived from the submerged membrane pump 7 is transferred to the slaked lime reaction tank 14. In the second embodiment of FIG. 3, the waste water, after controlled by a valve 48A provided on a branch pipe 44 derived from the submerged membrane pump 7, is partly introduced to a resin tower 36.

The purpose of introducing part of the waste water derived from the submerged membrane pump 7 to the resin tower 36 like this is to make the fluorine concentration in the treated water lower than that of conventional treatment with slaked lime or flocculants.

For example, in some cases, the fluorine concentration in the treatment waste water is set to 3 ppm or lower.

In this case, when the whole quantity of waste water is introduced to the resin tower 36, the fluorine concentration of the treated water becomes 1 ppm or lower, where although high-degree treatment of fluorine is achieved, there occur more frequent needs for regeneration by chemicals and for resin exchange after a specified period of use in the resin tower 36, which causes the running cost to increase. Further, there are demerits such as an increase in equipment expense due to the introduction of the whole quantity of waste water into the resin tower 36, i.e., an increase in initial cost, with an uneconomical result. Thus, there can be constituted a waste water treatment apparatus (waste water treatment method) in which treated water derived from the resin tower 36 and treated water derived from the settling tank 19 are mixed together so that the target water quality of a fluorine concentration of, for example, 3 ppm or lower can be met just enough.

More specifically, ion exchange resins or chelate resins are applicable as the resin tower 36. As water flow conditions by the valve 48A, although varying among resins, water flow with a flow rate of 4–8 $m^3$ waste water per hour relative to a resin volume of 1 $m^3$ is generally appropriate.

In this second embodiment, fluorine in the waste water, after treated by the resin tower 36, results in treated water with fluorine treated to high-degree treatment. Then, the treated water is introduced to a junction tank 47, mixed there with treated water derived from the settling tank 19, and rapidly agitated by the rapid agitator 15. Thus, the two flows of treated water different in water quality from each other become uniform in water quality, hence a targeted new treated water. It is noted that the ratio at which two flows of treated water different in water quality from each other are mixed together may be determined by measuring the fluorine concentration of the treated water derived from the resin tower 36 and the fluorine concentration of the treated water derived from the settling tank 19, according to which the degrees of openness of the valves 48A, 48B may be controlled. The fluorine concentration of the treated water at the junction tank 47 is measured by a fluorine concentration meter 49.

Meanwhile, the regeneration of resins at the resin tower 36 is performed with regenerative chemicals such as hydrochloric acid. The regenerated waste water containing the high-concentration fluorine is introduced to the raw water tank 1 and again treated at the reaction-tank lower part 3-3.

For treated water management in this waste water treatment equipment, when the fluorine concentration by the fluorine concentration meter 49 reads higher than the target concentration, the inlet quantity of waste water into the resin tower 36 may appropriately be increased by means of the valves 48A, 48B. Conversely, when the fluorine concentration by the fluorine concentration meter 49 reads lower than the target concentration, the inlet quantity of waste water into the resin tower 36 may appropriately be decreased.

According to this embodiment, since part of the treated water derived from the submerged membrane 9 is introduced to the resin tower 36 and treated, treated water having a fluorine concentration of 1 ppm or lower can be easily ensured after passing through the resin tower 36. Also, by merging, and treating together, the treated water that has passed through the resin tower 36 with the treated water derived from the settling tank 19, target water quality can be easily maintained. It is noted that since the waste water derived from the submerged membrane 9 contains no suspended solids, there never occurs deposition of suspended solids onto resins, thus making it easy to introduce to the resin tower 36 and treat the waste water.

In addition, in this second embodiment, a common fluorine concentration meter, Type HC, for waste water made by Denki Kagaku Keiki K.K. has been adopted as the fluorine concentration meter 49.

(Third Embodiment)

Figure 4:
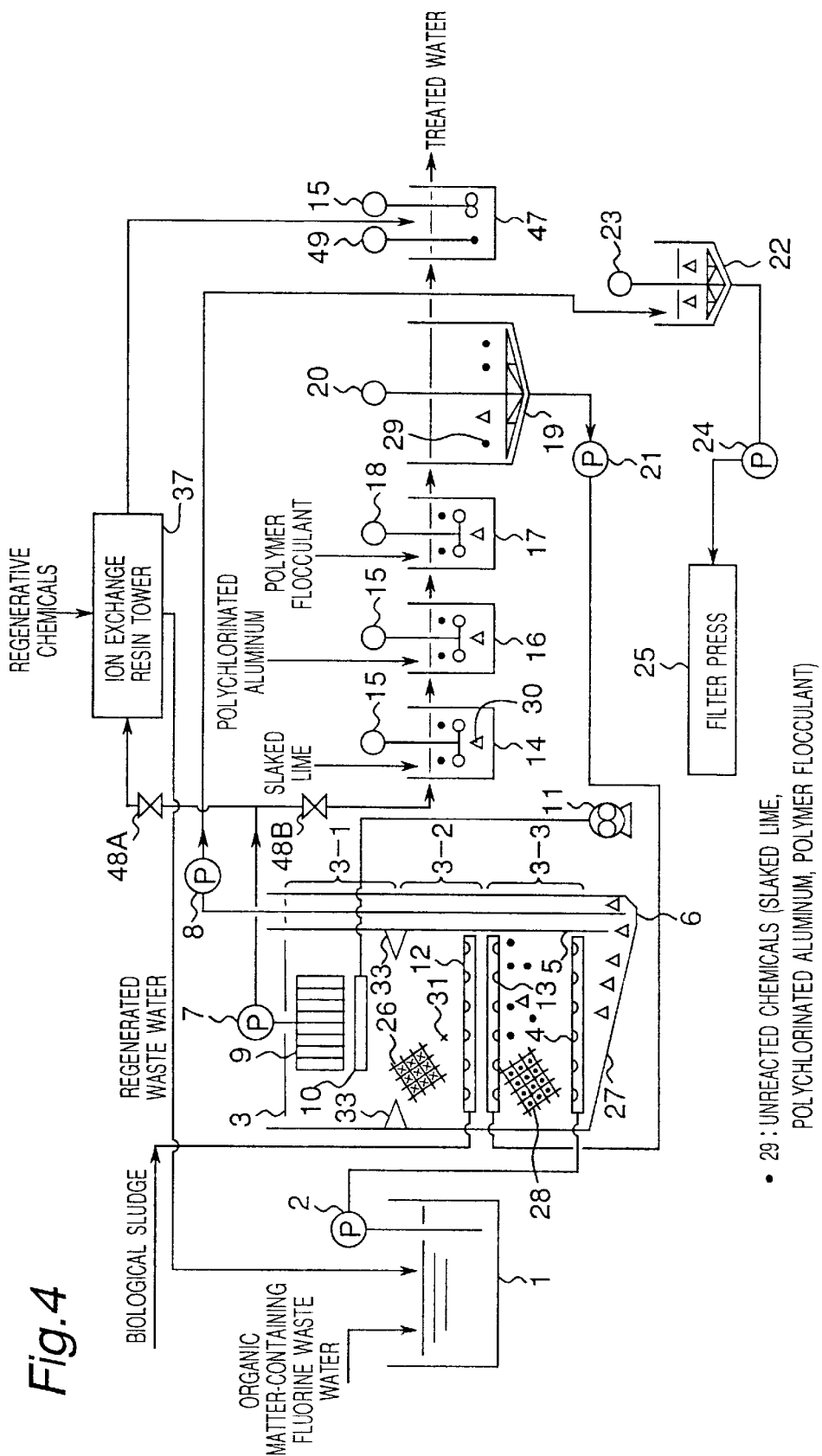
FIG. 4 is a constitutional diagram showing a third embodiment of the waste water treatment apparatus according to the present invention.

Next, FIG. 4 shows a third embodiment of the waste water treatment apparatus according to the present invention. This third embodiment differs from the foregoing second embodiment only in a point (i) that the resin tower 36 is an ion exchange resin tower 37. The third embodiment is fully the same as the foregoing second embodiment except this point (i). Therefore, the same constituent parts as in the foregoing third embodiment are designated by the same reference numerals and their detailed description is omitted:

In this third embodiment, concretely, Dia-ion SA, which is an anion exchange resin made by Mitsubishi Chemical Corporation is adopted as the ion exchange resin. The Dia-ion SA, which is an anion exchange resin made by Mitsubishi Chemical Corporation is capable of removing anions such as fluorine ions, sulfuric acid ions and chlorine ions. On the other hand, when high volume of coexitant ions are included in the waste water, there is a disadvantage that frequent regeneration of resins need to be performed.

(Fourth Embodiment)

Next, FIG. 5 shows a fourth embodiment of the waste water treatment apparatus according to the present invention. This fourth embodiment differs from the third embodiment only in the following point (i).

This fourth embodiment differs from the third embodiment in a point (i) that the ion exchange resin tower 37 is a chelate resin tower 38. The fourth embodiment is fully the same as the third embodiment except this point (i).

The chelate resin of the chelate resin tower 38 generally has a characteristic of being capable of selectively removing treatment-target ions even if various kinds of ions are present in the waste water. Thus, a higher treatment efficiency of treatment-target ions can be obtained.

More specifically, in this fourth embodiment, Eporas K-1, which is a chelate resin made by Miyoshi Oil & Fat Co., Ltd., is adopted as the chelate resin. The Eporas K-1, which is a chelate resin made by Miyoshi Oil & Fat Co., Ltd., has characteristics of being capable of selectively adsorbing and removing fluorine ions in the waste water and so superior in adsorptivity as to be able to remove fluorine ions to a low concentration of about 1 ppm, and moreover easy to regenerate by hydrochloric acid or the like so that the chelate resin that has adsorbed fluorine ions can be recycled over and over again.

In addition, FIG. 6A shows a processing timing chart for the individual tanks in the case where both organic matter concentration and fluorine concentration in the organic matter-containing fluorine waste water are normal concentrations, and FIG. 6B shows a processing timing chart for the individual tanks in the case where both organic matter concentration and fluorine concentration in the organic matter-containing fluorine waste water are low concentrations.

(Fifth Embodiment)

Next, FIG. 7 shows a fifth embodiment of the waste water treatment apparatus according to the present invention. This fifth embodiment differs from the foregoing first embodiment only in the following point (i). Therefore, the same constituent parts as in the foregoing first embodiment are designated by the same reference numerals and their detailed description is omitted:

(i) In this fifth embodiment, waste water derived from the submerged membrane pump 7 is introduced to the branch pipe 44, further introduced sequentially to an activated carbon tower 39, the ion exchange resin tower 37 and an reverse osmosis membrane unit 40, by which treated water treated by those parts is recycled as raw water for an ultrapure water production system 41.

According to this fifth embodiment, the waste water in which fluorine has been treated to high degree by resins is not used as the treated water taken out of the settling tank 19 but introduced to the ultrapure water system 41. Therefore, although the fluorine concentration in the treated water cannot be maintained at 3 ppm or lower, there is an advantage that the treated water can be recycled as raw water for the ultrapure water production system 41.

In this fifth embodiment, waste water is introduced to the activated carbon tower 39, then the ion exchange resin tower 37, and then the reverse osmosis membrane unit 40, by which various kinds of ions, organic matters and fine particles dissolved in the waste water are removed, thus making raw water for the ultrapure water production system 41.

(Sixth Embodiment)

Figure 8:
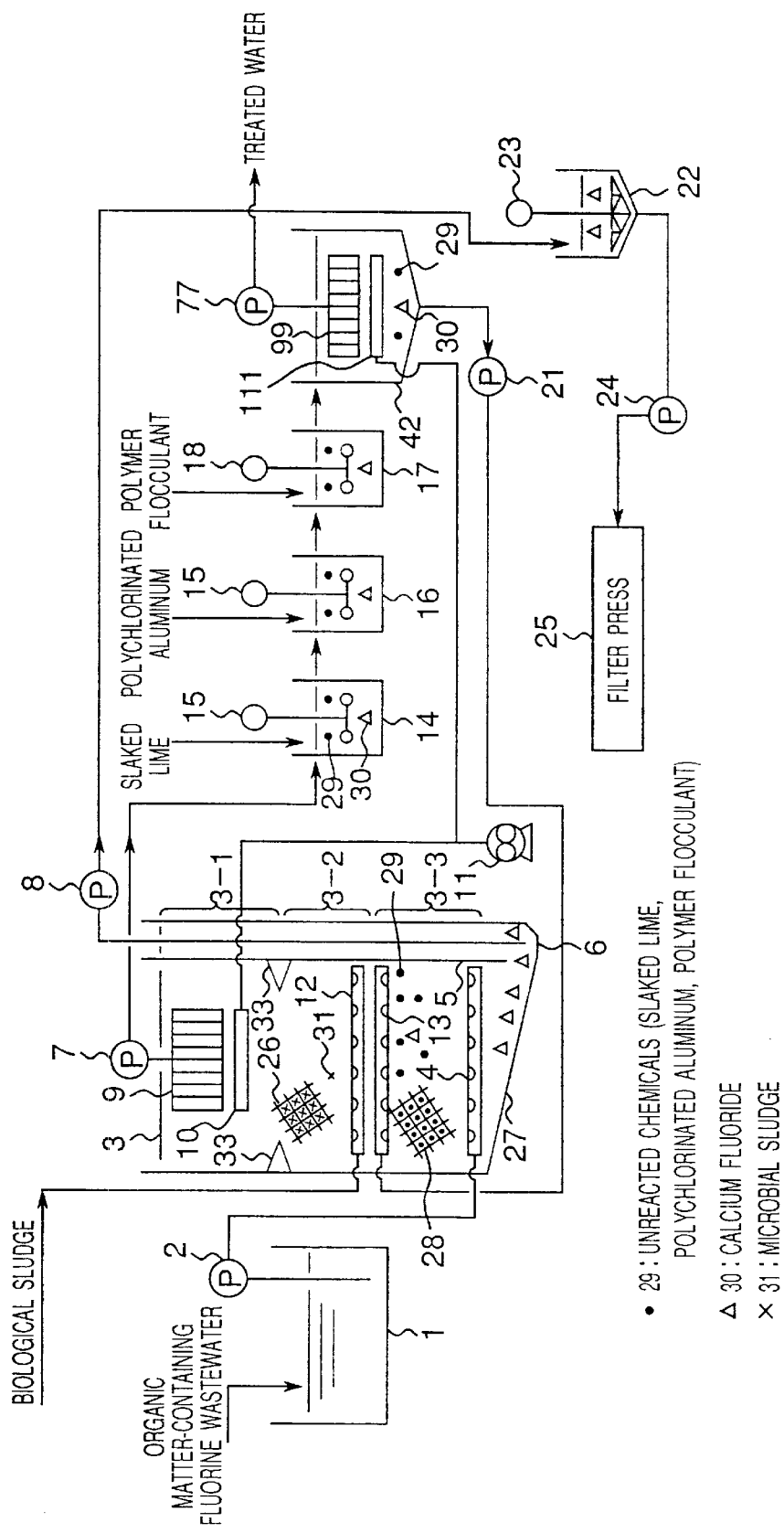
FIG. 8 is a constitutional diagram showing a sixth embodiment of the waste water treatment apparatus according to the present invention.

Next, FIG. 8 shows a sixth embodiment of the waste water treatment apparatus according to the present invention. This sixth embodiment differs from the foregoing first embodiment only in the following point (i). Therefore, the same constituent parts as in the foregoing first embodiment are designated by the same reference numerals and their detailed description is omitted:

(i) Whereas the settling tank 19 is present in the first embodiment, the settling tank 19 is not provided in the sixth embodiment and a membrane separation tank 42 is provided in place of the settling tank 19.

In this sixth embodiment, since solid-liquid separation of waste water is performed not by settling but by membrane separation in the membrane separation tank 42, there is a merit that the waste water is never deteriorated in water quality due to outflow of sludge in the settling. That is, with a submerged membrane 99 provided in the membrane separation tank 42, waste water is filtrated by the submerged membrane 99, by which treated water is obtained from a submerged membrane pump 77. Also, below the submerged membrane 99 is provided an air diffusing pipe 111 for normally air-cleaning the submerged membrane 99. As shown in FIG. 8, the air diffusing pipe 111 is connected to a blower 11 with piping. It is noted that as the submerged membrane 99 in the membrane separation tank 42, one of the same type made by the same manufacturer as the submerged membrane 99 set at the reaction-tank upper part 3-1 is selected in this sixth embodiment.

More concretely, size and power of the submerged membrane 99 in the membrane separation tank 42 are set in the number of membranes of the submerged membrane unit. In this case, since suspended solids are small quantity within the membrane separation tank 42, designing the sheet number of the submerged membrane 99 to about a half of the submerged membrane 9 of the reaction-tank upper part 3-1 relative to water quantity allows specified filtration performance to be achieved.

According to this embodiment, since waste water is treated by the membrane separation tank 42 having the submerged membrane 99 instead of a settling tank, deterioration in water quality due to sludge outflow that could occur in the case of a settling tank can be completely prevented by the submerged membrane 99. Therefore, treated water containing absolutely no suspended solids can be secured.

(Seventh Embodiment)

Figure 9:
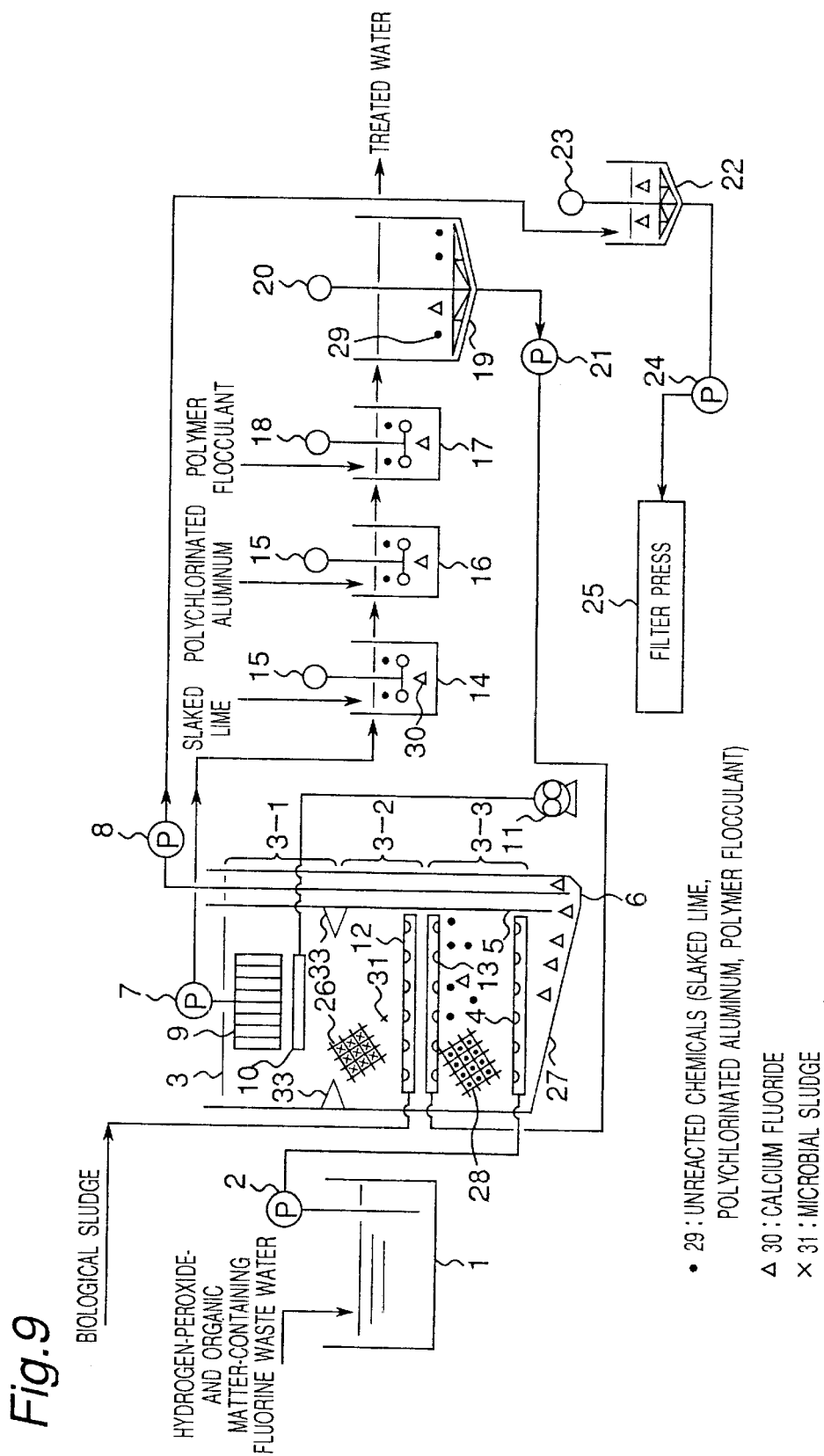
FIG. 9 is a constitutional diagram showing a seventh embodiment of the waste water treatment apparatus according to the present invention.

Next, FIG. 9 shows a seventh embodiment of the waste water treatment apparatus according to the present invention. This seventh embodiment differs from the foregoing first embodiment only in the following point (i). Therefore, the same constituent parts as in the foregoing first embodiment are designated by the same reference numerals and their detailed description is omitted:

(i) Whereas the waste water flowing into the raw water tank 1 is organic matter-containing fluorine waste water in the foregoing first embodiment, the waste water is hydrogen-peroxide- and organic matter-containing fluorine waste water in this seventh embodiment.

That is, in this seventh embodiment, fluorine waste water containing hydrogen peroxide and organic matters is let into the raw water tank 1. In this embodiment, fluorine waste water containing multiple components is introduced to the raw water tank 1, whereas the arrangement of the rest of the apparatus following the raw water tank 1 is fully the same as in the foregoing first embodiment.

In this seventh embodiment, hydrogen peroxide showing acidity in the waste water is treated by the reducibility (i.e., oxidation reduction reaction) of anaerobic microorganisms in the reaction-tank intermediate part (biological sludge zone) 3-2. Since no aeration means is provided at this reaction-tank intermediate part 3-2 and biological sludge is introduced thereto, biological sludge settles and concentrates as time elapses, so that anaerobic microorganisms propagate by taking the organic matters in the waste water as a nutrient source, thus treating hydrogen peroxide by reductive reaction.

Meanwhile, in the reaction-tank upper part 3-1, are provided a submerged membrane 9 and a submerged membrane pump 7, by which waste water is filtrated and separated into a concentrated side and a non-concentrated side. As a result, the reaction-tank upper part 3-1 and the reaction-tank intermediate part 3-2 fall on the concentrated side, where the waste water is further concentrated and anaerobic microorganisms are propagating at high concentration, so that hydrogen peroxide can be treated with high efficiency.

(Eighth Embodiment)

Figure 10:
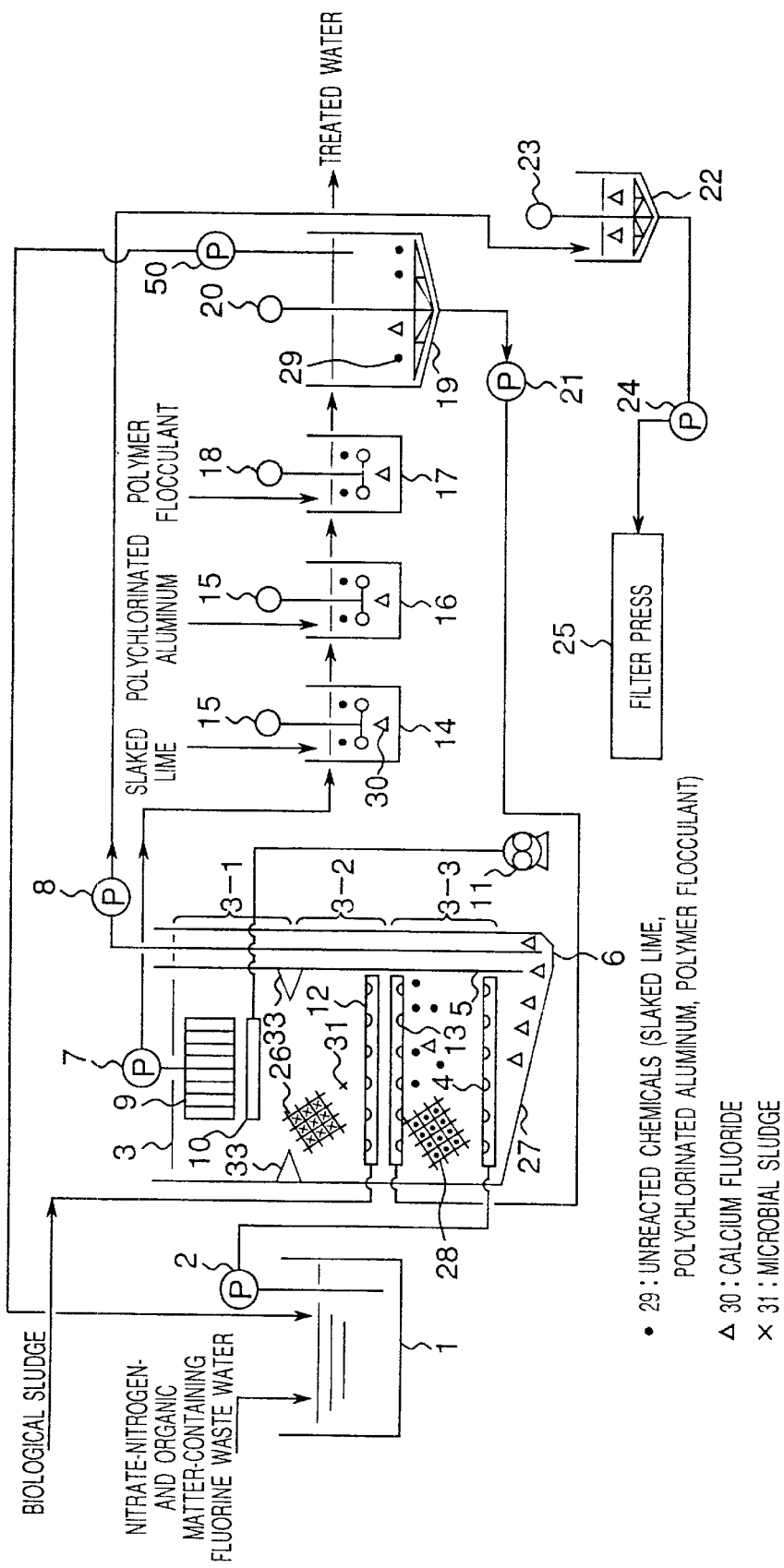
FIG. 10 is a constitutional diagram showing an eighth embodiment of the waste water treatment apparatus according to the present invention.

Next, FIG. 10 shows an eighth embodiment of the waste water treatment apparatus according to the present invention. This eighth embodiment differs from the foregoing first embodiment only in the following point (i). Therefore, the same constituent parts as in the foregoing first embodiment are designated by the same reference numerals and their detailed description is omitted:

(i) This eighth embodiment differs from the foregoing first embodiment only in that nitrate-nitrogen- and organic matter-containing fluorine waste water is let into the raw water tank 1 and that a circulating pump 50 is set at the settling tank 19.

In this eighth embodiment, with regard to nitrate nitrogen in the waste water, nitrate nitrogen is reduced so as to be treated as nitrogen gas by the reducibility of anaerobic microorganisms in the reaction-tank intermediate part (biological sludge zone) 3-2, and treated up to nitrogen gas with a small amount of organic matters in the waste water taken as a hydrogen donor. That is, a common denitrifying reaction is performed.

Since no aeration means is provided at this reaction-tank intermediate part 3-2 and biological sludge is introduced thereto, biological sludge settles and concentrates as time elapses, so that anaerobic microorganic matters propagate by taking the organic matters in the waste water as a nutrient source, thus treating nitrate nitrogen by reductive reaction.

Also, in the reaction-tank upper part 3-1, are provided a submerged membrane 9 and a submerged membrane pump 7, by which waste water is filtrated and separated into a concentrated side and a non-concentrated side. As a result, the reaction-tank upper part 3-1 and the reaction-tank intermediate part 3-2 fall on the concentrated side, where the waste water is further concentrated and anaerobic microorganisms are propagating at high concentration, so that nitrate nitrogen can be reductively treated with high efficiency.

Nitrate nitrogen in the waste water is treated only in the reaction-tank intermediate part 3-2, and not in any other tanks. The waste water containing a small amount of nitrate nitrogen having reached the settling tank 19 is returned to the raw water tank 1 by the circulating pump 50. Thereafter, nitrate nitrogen in the waste water is reductively treated again at the reaction-tank intermediate part 3-2. This circulation is a common practice which is generally executed in the reductive treatment of nitrate nitrogen, i.e., denitrifying reaction.

(Ninth Embodiment)

Figure 11:
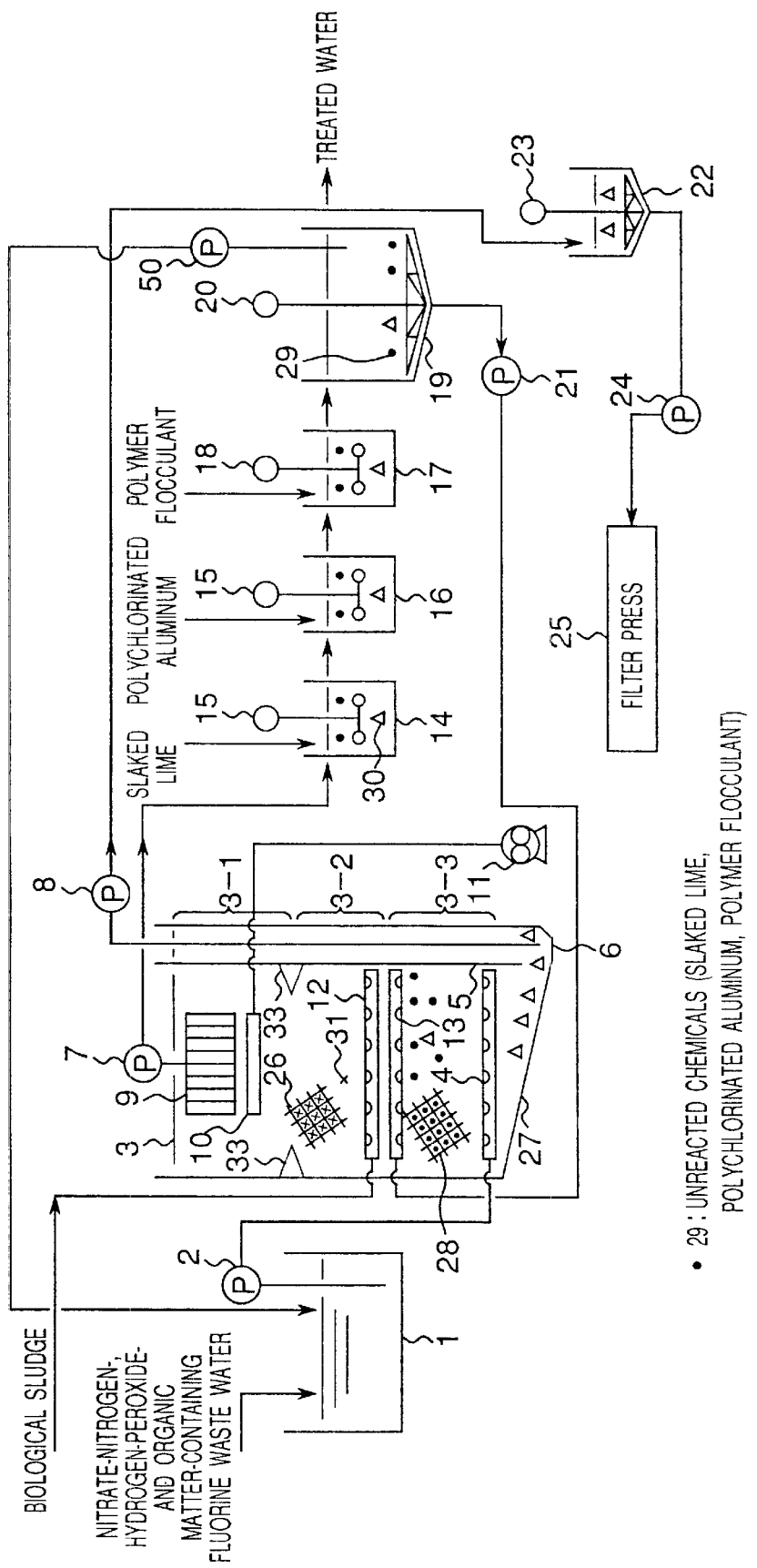
FIG. 11 is a constitutional diagram showing a ninth embodiment of the waste water treatment apparatus according to the present invention.

Next, FIG. 11 shows a ninth embodiment of the waste water treatment apparatus according to the present invention. This ninth embodiment differs from the foregoing first embodiment only in the following points (i) and (ii). Therefore, the same constituent parts as in the foregoing first embodiment are designated by the same reference numerals and their detailed description is omitted:

(i) Nitrate-nitrogen-, hydrogen-peroxide- and organic matter-containing fluorine waste water is let into the raw water tank 1. That is, whereas the waste water has been organic matter-containing fluorine waste water in the first embodiment, the waste water is multiple-components-containing fluorine waste water containing nitrate nitrogen, hydrogen peroxide and organic matters in this ninth embodiment; and (ii) In this ninth embodiment, apparatus arrangement following the raw water tank 1 is generally the same as in the first embodiment, but a circulating pump 50 is provided at the settling tank 19.

In this ninth embodiment, with regard to nitrate nitrogen and hydrogen peroxide in the waste water, by the reducibility of anaerobic microorganisms in the reaction-tank intermediate part (biological sludge zone) 3-2, nitrate nitrogen is reduced so as to be treated as nitrogen gas, and hydrogen peroxide showing acidity is treated by reduction. As a result, nitrate nitrogen is treated up to nitrogen gas with a small amount of organic matters in the waste water taken as a hydrogen donor, while hydrogen peroxide is treated up to water and oxygen gas.

Since no aeration means is provided at the reaction-tank intermediate part 3-2 and biological sludge is introduced thereto, biological sludge settles and concentrates as time elapses, so that anaerobic microorganisms propagate by taking the organic matters in the waste water as a nutrient source, thus treating nitrate nitrogen and hydrogen peroxide by reductive reaction.

Also, in the reaction-tank upper part 3-1, are provided a submerged membrane 9 and a submerged membrane pump 7, by which waste water is filtrated and separated into a concentrated side and a non-concentrated side. As a result, the reaction-tank upper part 3-1 and the reaction-tank intermediate part 3-2 fall on the concentrated side, where the waste water is further concentrated and anaerobic microorganisms are propagating at high concentration, so that nitrate nitrogen and hydrogen peroxide can be reductively treated with high efficiency.

Nitrate nitrogen in the waste water is treated only in the reaction-tank intermediate part 3-2, and not in any other tanks. The waste water containing a small amount of nitrate nitrogen having reached the settling tank 19 is returned to the raw water tank 1 by the circulating pump 50. Thereafter, nitrate nitrogen in the waste water is reductively treated again at the reaction-tank intermediate part 3-2. This circulation is a common practice which is generally executed in the reductive treatment of nitrate nitrogen, i.e., denitrifying reaction.

(Tenth Embodiment)

Figure 12:
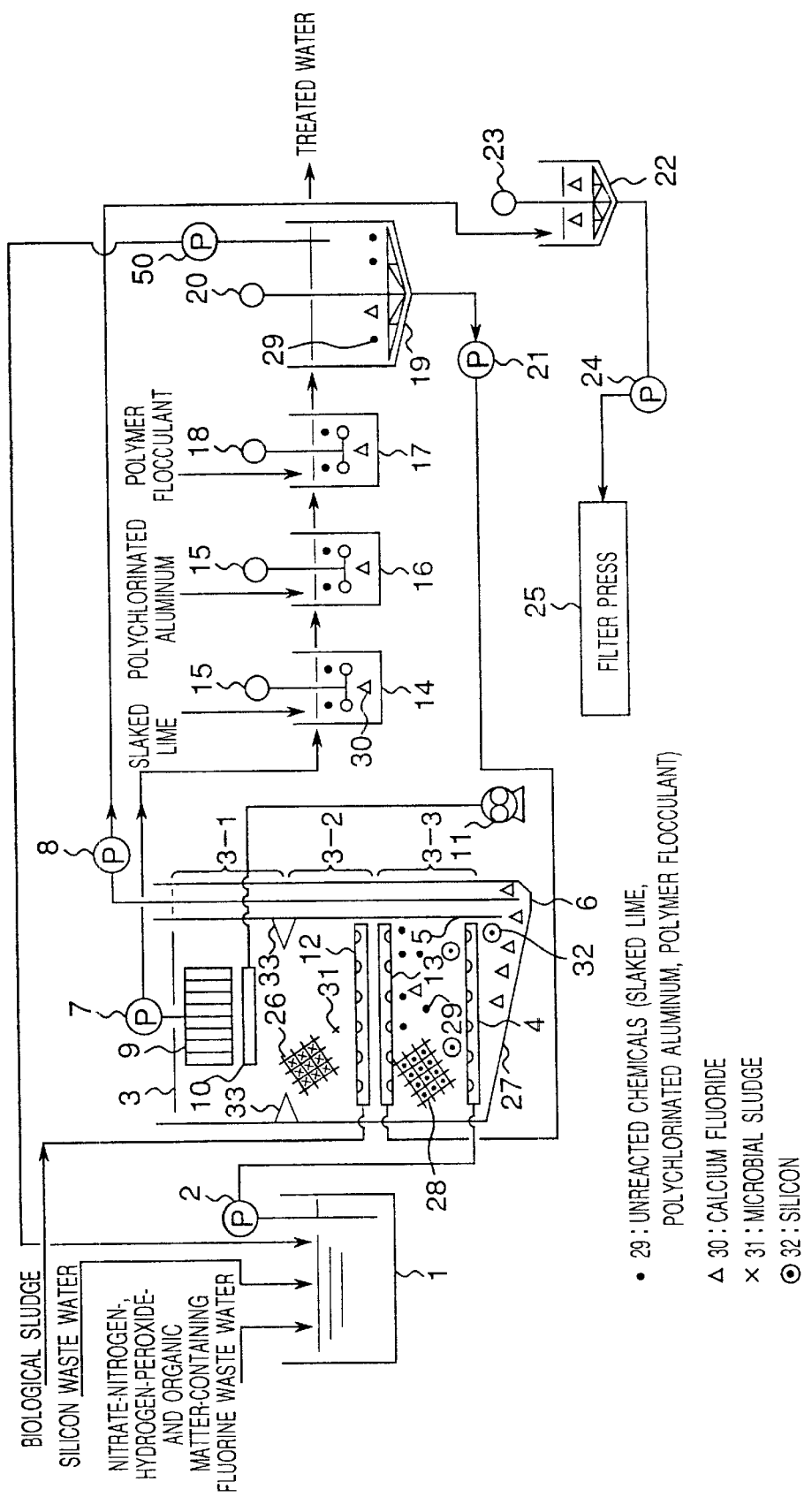
FIG. 12 is a constitutional diagram showing a tenth embodiment of the waste water treatment apparatus according to the present invention.

Next, FIG. 12 shows a tenth embodiment of the waste water treatment apparatus according to the present invention. This tenth embodiment differs from the foregoing first embodiment only in the following points (i) and (ii). Therefore, the same constituent parts as in the foregoing first embodiment are designated by the same reference numerals and their detailed description is omitted:

(i) In this tenth embodiment, firstly, nitrate-nitrogen-, hydrogen-peroxide- and organic matter-containing fluorine waste water is introduced into the raw water tank 1, and secondly, silicon waste water is introduced into the raw water tank 1 (in the first embodiment, waste water to be let into the raw water tank 1 was organic matter-containing fluorine waste water); and (ii) A circulating pump 50 is provided at the settling tank 19 (apparatus arrangement following the raw water tank 1 is the same as in the first embodiment).

With regard to nitrate nitrogen and hydrogen peroxide in the waste water, by the reducibility of anaerobic microorganisms in the reaction-tank intermediate part (biological sludge zone) 3-2, nitrate nitrogen is reduced so as to be treated as nitrogen gas, and hydrogen peroxide showing acidity is treated by reduction. The nitrate nitrogen is treated up to nitrogen gas with a small amount of organic matters in the waste water taken as a hydrogen donor, while the hydrogen peroxide is treated up to water and oxygen gas.

Meanwhile, since no aeration means is provided at the reaction-tank intermediate part 3-2 and biological sludge is introduced thereto, biological sludge settles and concentrates as time elapses, so that anaerobic microorganisms propagate by taking the organic matters in the waste water as a nutrient source, thus treating nitrate nitrogen and hydrogen peroxide by reductive reaction.

Also, in this tenth embodiment, in the reaction-tank upper part 3-1, are provided a submerged membrane 9 and a submerged membrane pump 7, by which waste water is filtrated and separated into a concentrated side and a non-concentrated side. As a result, the reaction-tank upper part 3-1 and the reaction-tank intermediate part 3-2 fall on the concentrated side, where the waste water is further concentrated and anaerobic microorganisms are propagating at high concentration, so that nitrate nitrogen and hydrogen peroxide can be reductively treated with high efficiency.

Meanwhile, minute silicon in silicon waste water is flocculated in the reaction-tank lower part 3-3 by polychlorinated aluminum in the unreacted chemicals 29 returned by the sludge return pump 21 as well as polymer flocculants, becoming easier to settle, moving to the settling part 6 and being introduced into the concentration tank 22 by the settling part pump 8.

In addition, nitrate nitrogen in the waste water is treated only in the reaction-tank intermediate part 3-2, and not in any other tanks.

The waste water containing only a small amount of nitrate nitrogen having reached the settling tank 19 is returned to the raw water tank 1 by the circulating pump 50. Thereafter, nitrate nitrogen in the waste water is reductively treated again at the reaction-tank intermediate part 3-2. This circulation is a common practice which is generally executed in the reductive treatment of nitrate nitrogen, i.e., denitrifying reaction.

(Eleventh Embodiment)

Figure 13:
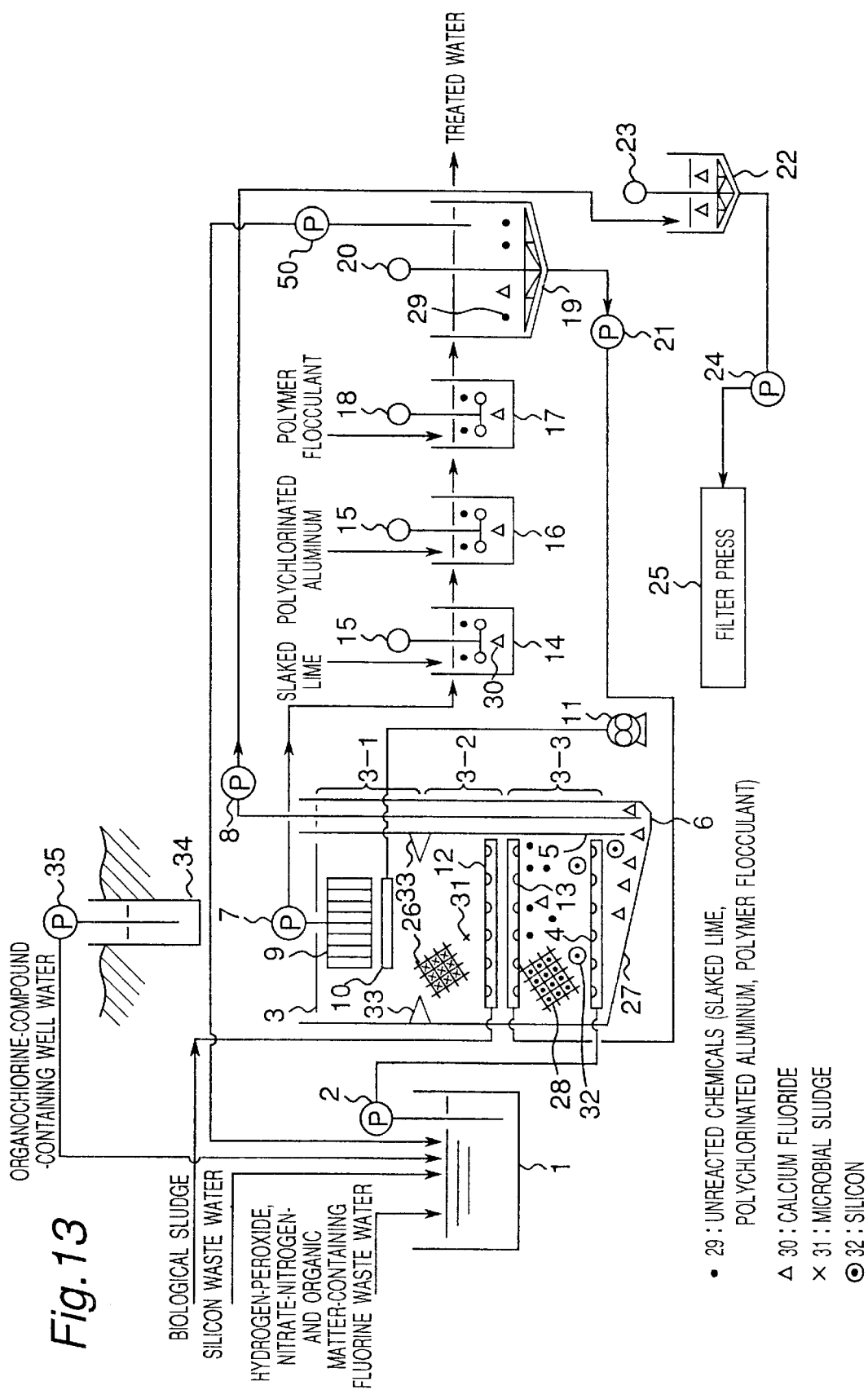
FIG. 13 is a constitutional diagram showing an eleventh embodiment of the waste water treatment apparatus according to the present invention.

Next, FIG. 13 shows an eleventh embodiment of the waste water treatment apparatus according to the present invention. This eleventh embodiment differs from the foregoing first embodiment only in the following points (i) and (ii). Therefore, the same constituent parts as in the foregoing first embodiment are designated by the same reference numerals and their detailed description is omitted:

(i) In this eleventh embodiment, firstly, nitrate-nitrogen-, hydrogen-peroxide- and organic matter-containing fluorine waste water is introduced into the raw water tank 1, and secondly, silicon waste water is introduced into the raw water tank 1, and further thirdly, organochlorine-compounds-containing well water is introduced from a well 34 into the raw water tank 1 by a pump 35 (in the first embodiment, waste water to be let into the raw water tank 1 was organic matter-containing fluorine waste water); and (ii) A circulating pump 50 is provided at the settling tank 19.

In this eleventh embodiment, with regard to nitrate nitrogen and hydrogen peroxide in the waste water, by the reducibility of anaerobic microorganisms in the reaction-tank intermediate part (biological sludge zone) 3-2, nitrate nitrogen is reduced so as to be treated as nitrogen gas, and hydrogen peroxide showing acidity is treated by reduction. As a result, nitrate nitrogen is treated up to nitrogen gas with a small amount of organic matters in the waste water taken as a hydrogen donor, while hydrogen peroxide is treated up to water and oxygen gas.

Since no aeration means is provided at the reaction-tank intermediate part 3-2 and biological sludge is introduced thereto, biological sludge settles and concentrates as time elapses, so that anaerobic microorganisms propagate by taking the organic matters in the waste water as a nutrient source, thus treating nitrate nitrogen and hydrogen peroxide by reductive reaction. Also, in this tenth embodiment, in the reaction-tank upper part 3-1, are provided a submerged membrane 9 and a submerged membrane pump 7, by which waste water is filtrated and separated into a concentrated side and a non-concentrated side, so that the reaction-tank upper part 3-1 and the reaction-tank intermediate part 3-2 fall on the concentrated side. As a result, the waste water is further concentrated and anaerobic microorganisms are propagating at high concentration, so that nitrate nitrogen and hydrogen peroxide can be reductively treated with high efficiency.

Meanwhile, minute silicon in silicon waste water is flocculated in the reaction-tank lower part 3-3 by polychlorinated aluminum in the unreacted chemicals 29 returned by the sludge return pump 21 as well as polymer flocculants, becoming easier to settle, moving to the settling part 6 and being introduced into the concentration tank 22 by the settling part pump 8.

Furthermore, the organochlorine compounds in the organochlorine-compounds-containing well water is treated in the reaction-tank lower part 3-3 by the dechlorination action of silicon particles. Since silicon particles are flocculated by flocculants and settled at high concentration, organochlorine compounds are treated with high efficiency.

Meanwhile, nitrate nitrogen in the waste water is treated only in the reaction-tank intermediate part 3-2, and not in any other tanks. The waste water containing a small amount of nitrate nitrogen having reached the settling tank 19 is returned to the raw water tank 1 by the circulating pump 50. Thereafter, nitrate nitrogen in the waste water is reductively treated again at the reaction-tank intermediate part 3-2. This circulation is a common practice which is generally executed in the reductive treatment of nitrate nitrogen, i.e., denitrifying reaction.

(Twelfth Embodiment)

Figure 14:
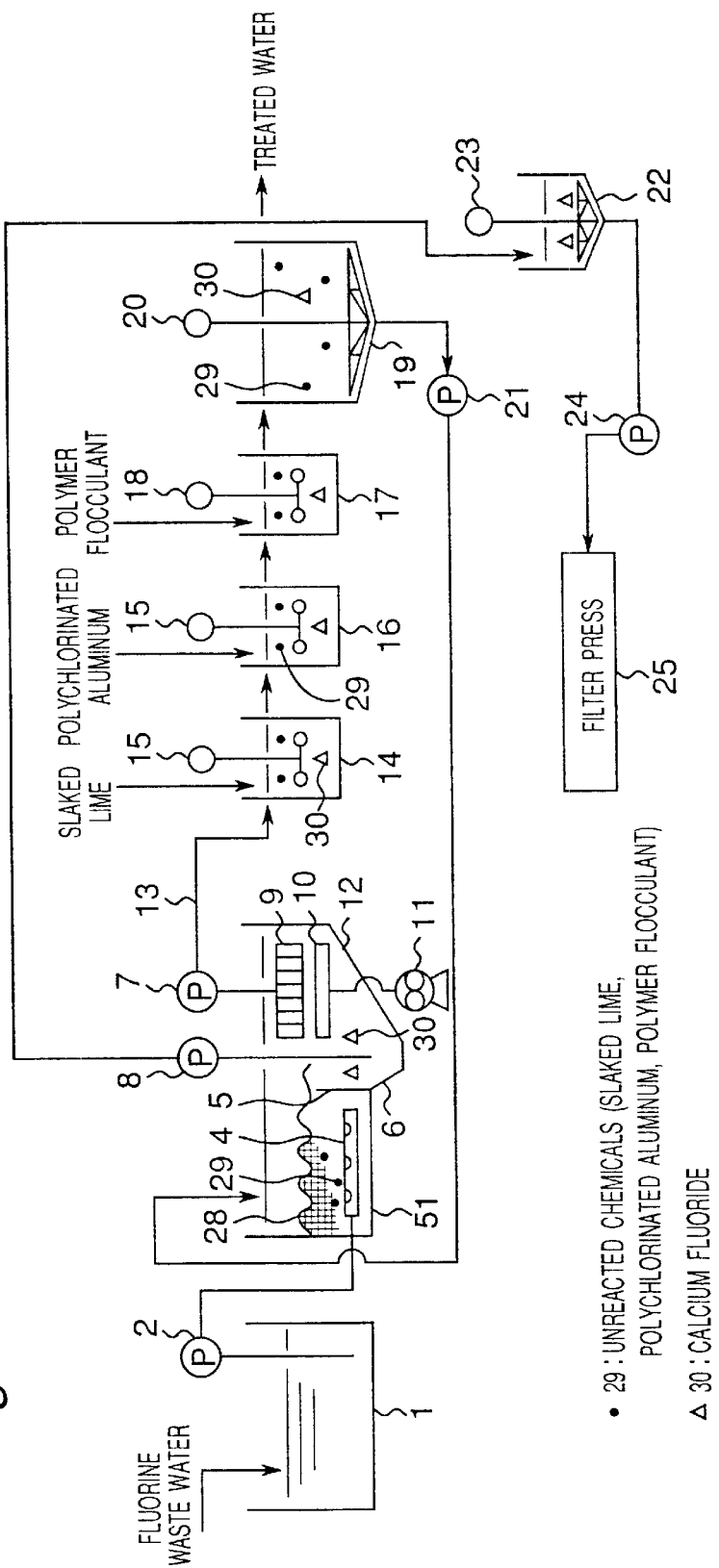
FIG. 14 is a constitutional diagram showing a twelfth embodiment of the waste water treatment apparatus according to the present invention.

Next, FIG. 14 shows a twelfth embodiment of the waste water treatment apparatus according to the present invention. This twelfth embodiment differs from the foregoing first embodiment only in the following points (i) and (ii). Therefore, the same constituent parts as in the foregoing first embodiment are designated by the same reference numerals and their detailed description is omitted:

(i) Whereas influent waste water is organic matter-containing fluorine waste water in the first embodiment, influent waste water is fluorine waste water in the twelfth embodiment; and (ii) Whereas a reaction tank 3 having organic matter-treating capability is provided for the introduction of biological sludge in the first embodiment, a chemical-sludge-zone reaction tank 51 is provided in place of the reaction tank 3 in the twelfth embodiment. This chemical-sludge-zone reaction tank 51 has no biological sludge introduced thereto and does not have organic matter-treating capability.

Since biological sludge is not introduced, the chemical-sludge-zone reaction tank 51 has no capability of treating organic matters in the waste water, unlike the foregoing reaction tank 3. As a matter of course, this reaction tank 51 does not have the capability of treating nitrate nitrogen or hydrogen peroxide, either.

However, in this twelfth embodiment, unreacted chemicals 29 can be introduced, and recycled, into the chemical-sludge-zone reaction tank 51 by the sludge return pump 21.

Also, concurrently, calcium fluoride 30 settled in the settling part 6 can be introduced directly into the concentration tank 22 by the settling part pump 8. Therefore, since only the calcium fluoride 30 containing no unreacted chemicals 29 is introduced into the concentration tank 22 and then dehydrated, sludge as a waste material can be reduced.

In addition, the chemical-sludge-zone reaction tank 51 is non-cubical structured, whereas the reaction tank 3 is cubical.

(Thirteenth Embodiment)

Figure 15:
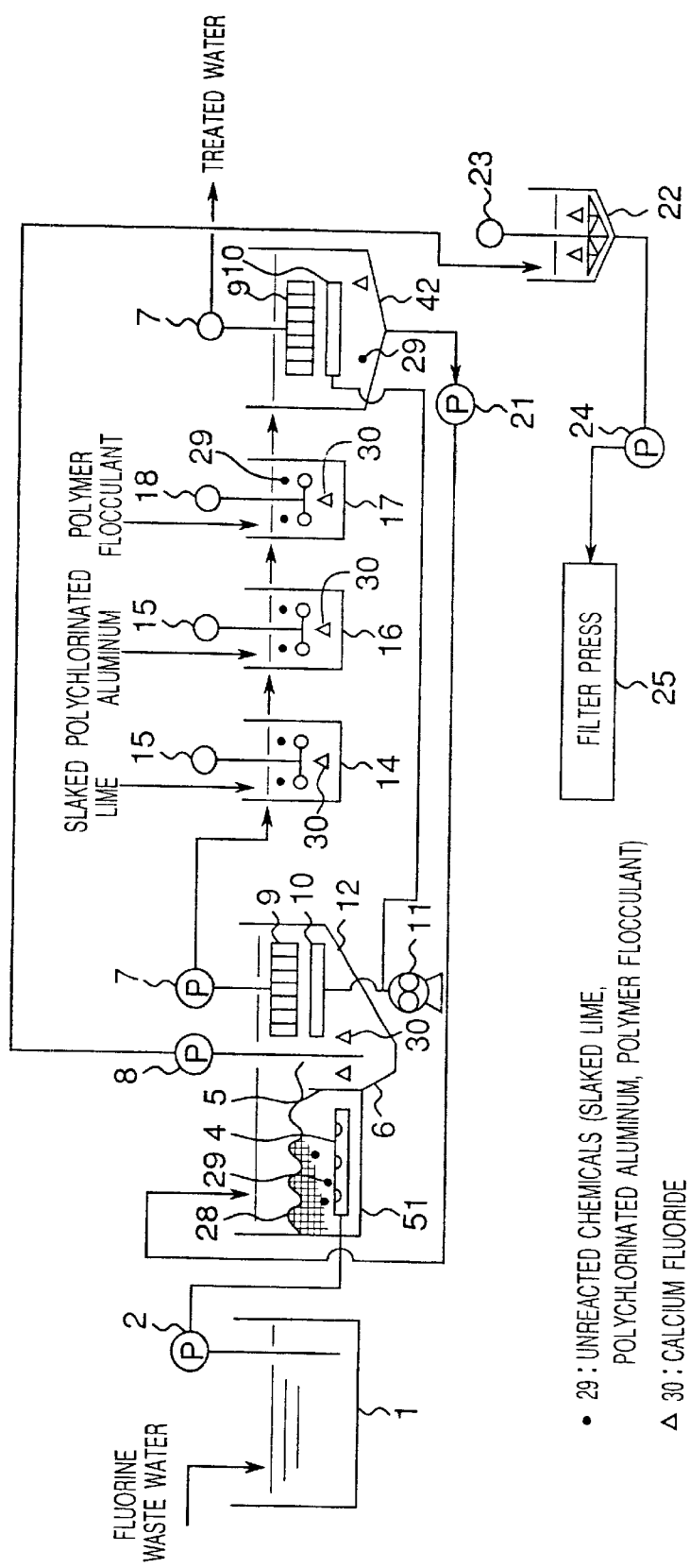
FIG. 15 is a constitutional diagram showing a thirteenth embodiment of the waste water treatment apparatus according to the present invention.
Figure 16:
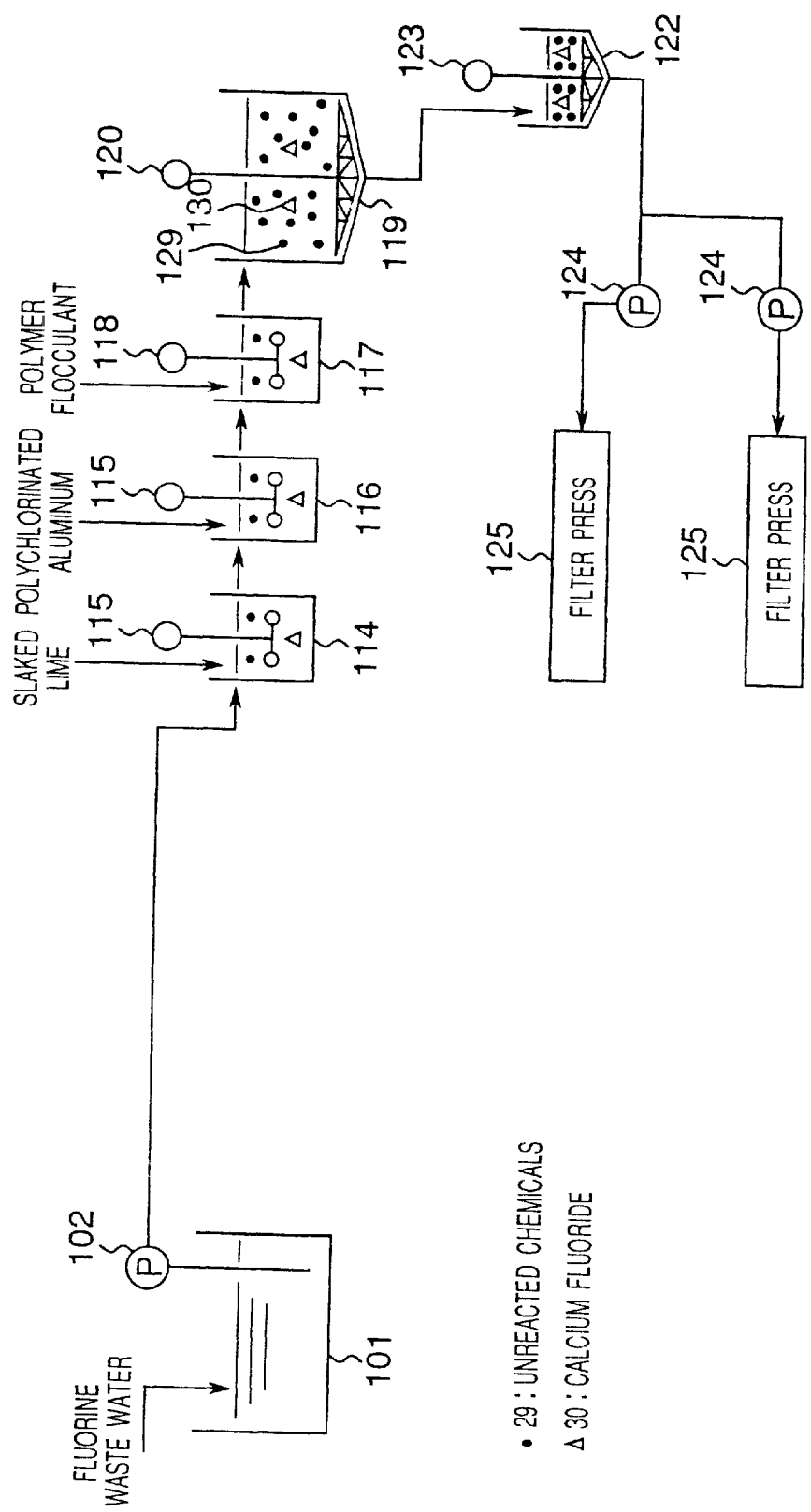
FIG. 16 is a view showing the constitution of the first prior art example.
Figure 17:
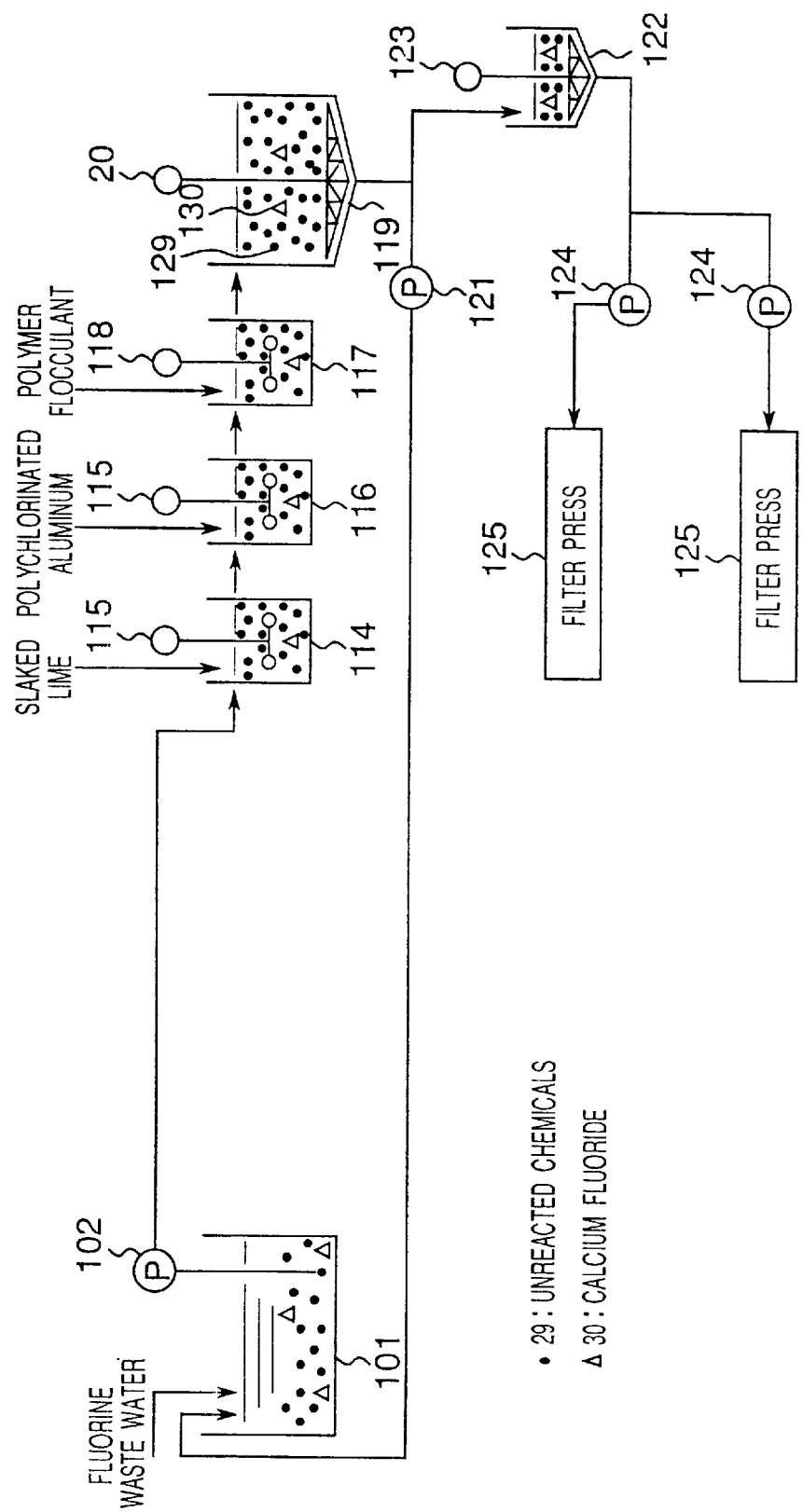
FIG. 17 is a view showing the constitution of the second prior art example.
Figure 18:
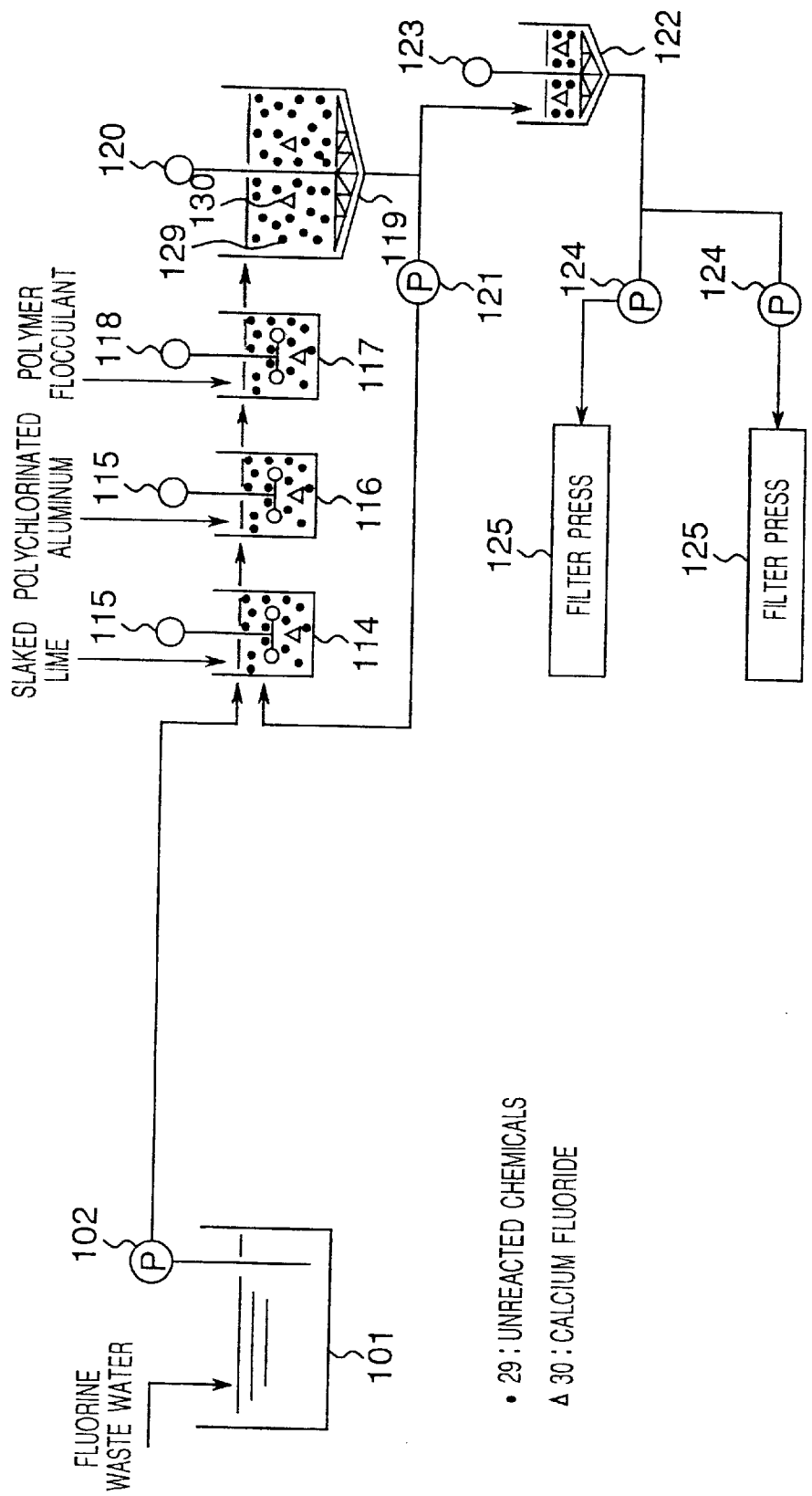
FIG. 18 is a view showing the constitution of the third prior art example.
Figure 19:
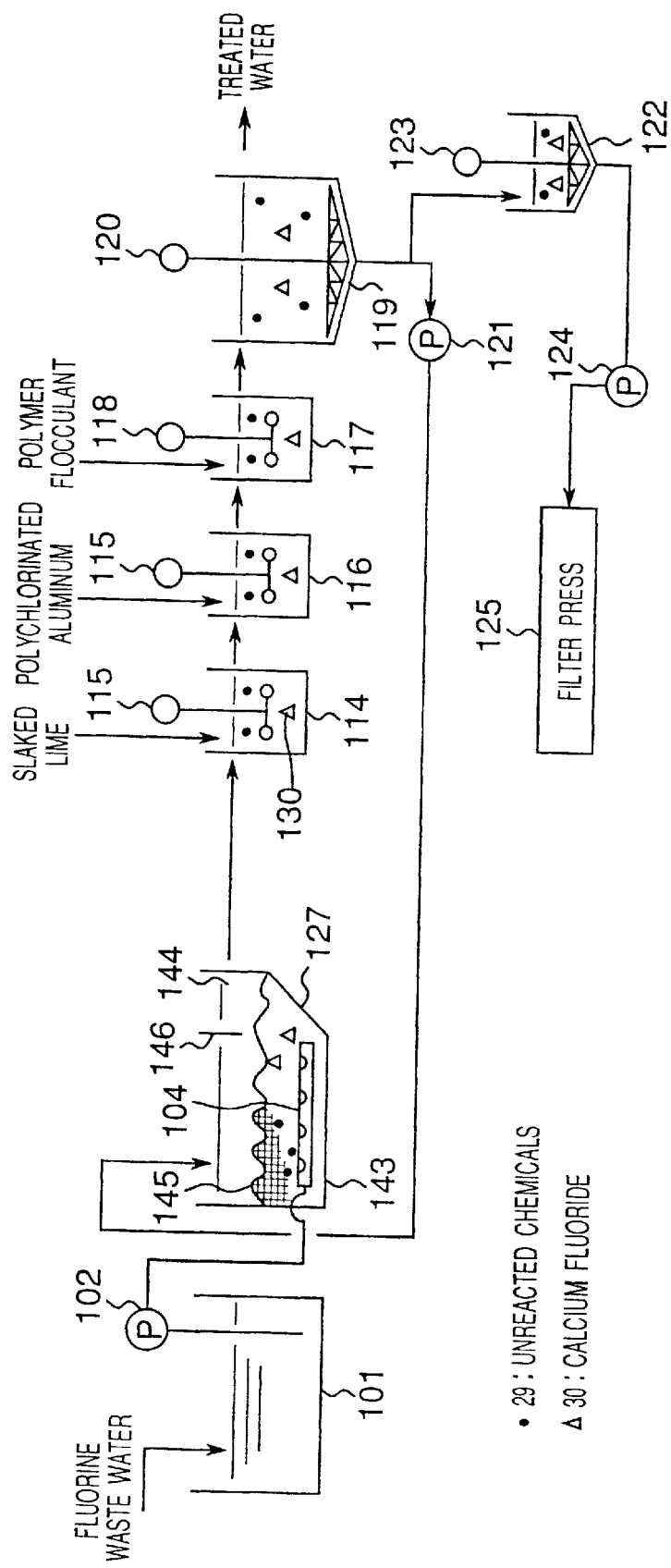
FIG. 19 is a view showing the constitution of the fourth prior art example.
Figure 20:
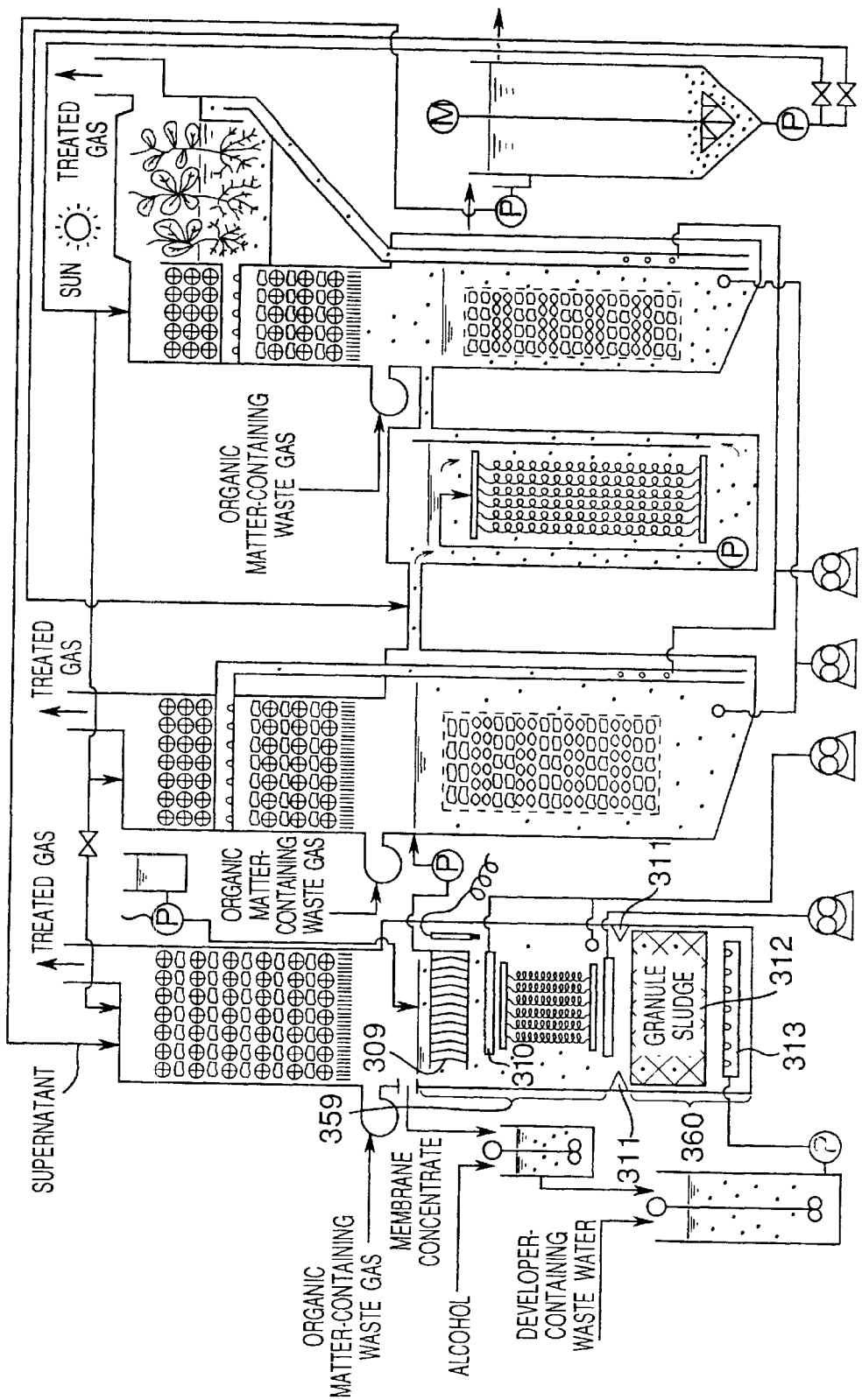
FIG. 20 is a view showing the constitution of the fifth prior art example.
Figure 21:
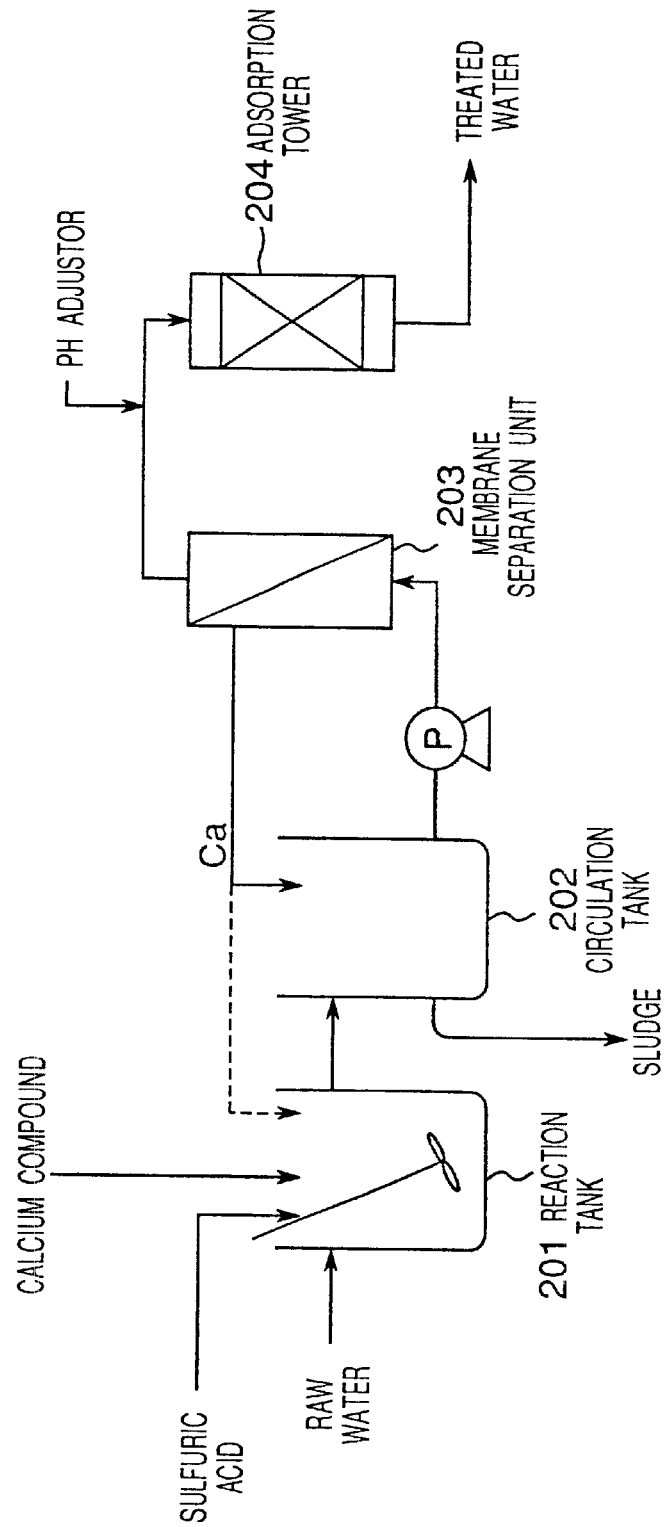
FIG. 21 is a view showing the constitution of the sixth prior art example.

Next, FIG. 15 shows a thirteenth embodiment of the waste water treatment apparatus according to the present invention. This thirteenth embodiment differs from the foregoing twelfth embodiment only in the following point (i). Therefore, the same constituent parts as in the foregoing twelfth embodiment are designated by the same reference numerals and their detailed description is omitted:

(i) In this thirteenth embodiment, a membrane separation tank 42 is provided in place of the settling tank 19.

Therefore, in this thirteenth embodiment, since treated water is obtained from both a submerged membrane 9 provided within the membrane separation tank 42 and a submerged membrane pump 7 connected to the submerged membrane 9, treated water containing no suspended solids can be ensured. Also, an air diffusing pipe 10 for normally air-cleaning the submerged membrane 9 is installed below the submerged membrane 9. This air diffusing pipe 10 is connected to a blower 11 with piping.

FIRST WORKING EXAMPLE

Next, a working example of waste water treatment using experimental equipment of the same structure as in the first embodiment shown in FIG. 1 is described as a concrete example.

In this example, the capacity of the raw water tank 1 was about 2 m$^3$, the capacity of the reaction tank 3 was about 6 m$^3$, the capacities of the slaked lime reaction tank 14, the polychlorinated aluminum reaction tank 16 and the polymer-flocculant flocculation tank 17 were each about 1 m$^3$, the capacity of the settling tank 19 was 3 m$^3$, and the capacity of the concentration tank 22 was about 1 m$^3$.

With this experimental equipment, waste water having a pH of 2.2, a fluorine concentration of 163 ppm, a COD (Chemical Oxygen Demand) concentration as organic matters of 42 ppm and a nitrate nitrogen concentration of 33 ppm was treated. The treated waste water showed a pH of 7.3, a fluorine concentration of 6 ppm, a COD concentration of 2 ppm and a nitrate nitrogen concentration of 3 ppm.

SECOND WORKING EXAMPLE

Next, a working example of waste water treatment using experimental equipment of the same structure as in the fourth embodiment shown in FIG. 5 is described as a concrete example.

In this second example, the capacity of the raw water tank 1 was about 2 m$^3$, the capacity of the reaction tank 3 was about 6 m$^3$, and the capacities of the slaked lime reaction tank 14, the polychlorinated aluminum reaction tank 16 and the polymer-flocculant flocculation tank 17 were each about 1 m$^3$. Also, the capacity of the settling tank 19 was 3 m$^3$, the capacity of the concentration tank 22 was about 1 m$^3$, and the capacity of the chelate resin tower 38 was 0.3 m$^3$.

With this experimental equipment, waste water having a pH of 2.4, a fluorine concentration of 187 ppm, a COD concentration of 45 ppm and a nitrate nitrogen concentration of 35 ppm was treated. In this treatment, in particular, with a view to attaining a fluorine concentration of not less than 2.5 ppm and not more than 3 ppm, inflow quantity of waste water into the chelate resin tower 38 and the slaked lime reaction tank 14 was controlled by valves 48A, 48B. As a result, in the treated waste water, a pH of 7.6, a fluorine concentration of 2.7 ppm, a COD concentration of 2 ppm and a nitrate nitrogen concentration of 3 ppm were able to be obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A waste water treatment method comprising:
   providing a reaction tank including a biological sludge zone above a chemical sludge zone;
   introducing biological sludge into the biological sludge zone and chemical sludge into the chemical sludge zone;
   introducing organic matter-containing fluorine waste water into the chemical sludge zone where the waste water is treated and thereafter moves upward and is treated in the biological sludge zone.

2. The waste water treatment method according to claim 1, wherein
   organic matters of the organic matter-containing fluorine waste water are organic matters derived from IPA or acetone and surface-active agents.

3. A waste water treatment apparatus comprising:
   a reaction tank including a chemical sludge zone for receiving chemical sludge including calcium and a biological sludge zone for receiving biological sludge, wherein the chemical sludge zone is located at an elevation below the biological sludge zone,
   wherein organic matter-containing fluorine waste water is introduced into the chemical sludge zone, below the biological sludge zone, and treated in the reaction tank via both the chemical and biological sludge zones.

4. The waste water treatment apparatus according to claim 3, wherein
   the reaction tank has a membrane separation unit.

5. The waste water treatment apparatus according to claim 4, wherein
   the membrane separation unit is a submerged membrane.

6. The waste water treatment apparatus according to claim 5, wherein
   the submerged membrane is an ultrafiltration membrane or a microfiltration membrane.

7. The waste water treatment apparatus of claim 3, wherein the reaction tank further comprises a aeration zone located at an elevation above each of the chemical sludge zone and the biological sludge zone.

8. The waste water treatment apparatus of claim 7, wherein a wall portion is provided partly between the aeration zone and the biological sludge zone.

9. An apparatus comprising a waste water treatment apparatus wherein organic matter-containing fluorine waste water is treated by a reaction tank into which biological sludge and calcium-containing chemical sludge are introduced,
   wherein the reaction tank has an aeration zone having a membrane separation unit, a biological sludge zone and a chemical sludge zone disposed from above to below in this order, and
   organic matter-containing fluorine waste water is introduced from lower part of the reaction tank for treatment.

10. The waste water treatment apparatus according to claim 9, wherein return sludge containing unreacted chemicals from a settling tank is introduced to the chemical sludge zone of the reaction tank.

11. The waste water treatment apparatus according to claim 9, wherein
    the reaction tank has a settling part communicating with its chemical sludge zone, and sludge of the settling part is introduced to a concentration tank, concentrated there, and thereafter dehydrated.

12. The waste water treatment apparatus according to claim 9, wherein
    the biological sludge zone comprises concentrated biological sludge and the chemical sludge zone comprises concentrated chemical sludge.

13. The waste water treatment apparatus according to claim 9, wherein
    the reaction tank has a partitioning wall between the aeration zone and the biological sludge zone.

14. A waste water treatment apparatus comprising:
    reaction tank comprising an aeration zone having a membrane separation unit, a biological sludge zone and a chemical sludge zone communicating with a settling part, and to which chemical sludge and biological sludge are introduced;
    a slaked lime reaction tank into which slaked lime is added;
    a polychlorinated aluminum flocculation tank into which polychlorinated aluminum is added;
    a polymer-flocculant flocculation tank into which a polymer flocculant is added; and
    a settling tank for performing solid-liquid separation, wherein
    organic matter-containing fluorine waste water is introduced sequentially to these tanks and thereby treated.

15. The waste water treatment apparatus according to claim 14, wherein
    sludge settled in the settling tank is returned to the chemical sludge zone of the reaction tank.

16. The waste water treatment apparatus according to claim 14, wherein
    part of treated water derived from the membrane separation unit is introduced to a resin tower so as to be treated there, and its resulting treated water and treated water derived from the settling tank are merged together and treated.

17. The waste water treatment apparatus according to claim 14, wherein
    part of treated water derived from the membrane separation unit is introduced to an ion exchange resin tower, treated there, and then merged with treated water derived from the settling tank and treated.

18. The waste water treatment apparatus according to claim 14, wherein
    part of treated water derived from the membrane separation unit is introduced to a chelate resin tower, treated there, and merged with treated water derived from the settling tank and treated.

19. The waste water treatment apparatus according to claim 14, wherein part of treated water derived from the membrane separation unit is introduced to an activated carbon tower, an ion exchange resin tower and a reverse osmosis membrane unit, and then introduced to an ultrapure water production system so as to be recycled.

20. A waste water treatment apparatus comprising:
a reaction tank comprising an aeration zone having a membrane separation unit, a biological sludge zone and a chemical sludge zone communicating with a settling part, and to which chemical sludge and biological sludge are introduced;
a slaked lime reaction tank into which slaked lime is added;
a polychlorinated aluminum flocculation tank into which polychlorinated aluminum is added;
a polymer-flocculant flocculation tank into which a polymer flocculant is added; and
a membrane separation tank having a membrane separation unit for performing solid-liquid separation, wherein
organic matter-containing fluorine waste water is introduced sequentially to these tanks and thereby treated.

21. A waste water treatment apparatus comprising:
a reaction tank comprising an aeration zone having aerobic microorganisms propagated therein and having a membrane separation unit, a biological sludge zone having anaerobic microorganisms propagated therein, and a chemical sludge zone having calcium present therein and communicating with a settling part, and to which chemical sludge and biological sludge are introduced;
a slaked lime reaction tank into which slaked lime is added;
a polychlorinated aluminum flocculation tank into which polychlorinated aluminum is added;
a polymer-flocculant flocculation tank into which a polymer flocculant is added; and
a settling tank for performing solid-liquid separation, wherein
hydrogen-peroxide- and organic matter-containing fluorine waste water is introduced sequentially to these tanks and thereby treated.

22. A waste water treatment apparatus comprising:
a reaction tank comprising an aeration zone having aerobic microorganisms propagated therein and having a membrane separation unit, a biological sludge zone having anaerobic microorganisms propagated therein, and a chemical sludge zone having calcium present therein and communicating with a settling part, and to which chemical sludge and biological sludge are introduced;
a slaked lime reaction tank into which slaked lime is added;
a polychlorinated aluminum flocculation tank into which polychlorinated aluminum is added;
a polymer-flocculant flocculation tank into which a polymer flocculant is added; and
a settling tank for performing solid-liquid separation, wherein
nitrate-nitrogen- and organic matter-containing fluorine waste water is introduced sequentially to these tanks and thereby treated.

23. A waste water treatment apparatus comprising:
a reaction tank comprising an aeration zone having aerobic microorganisms propagated therein and having a membrane separation unit, a biological sludge zone having anaerobic microorganisms propagated therein, and a chemical sludge zone having calcium present therein and communicating with a settling part, and to which chemical sludge and biological sludge are introduced;
a slaked lime reaction tank into which slaked lime is added;
a polychlorinated aluminum flocculation tank into which polychlorinated aluminum is added;
a polymer-flocculant flocculation tank into which a polymer flocculant is added; and
a settling tank for performing solid-liquid separation, wherein
hydrogen-peroxide-, nitrate-nitrogen- and organic matter-containing fluorine waste water is introduced sequentially to these tanks and thereby treated.

24. A waste water treatment apparatus comprising:
a reaction tank comprising an aeration zone having aerobic microorganisms propagated therein and having a membrane separation unit, a biological sludge zone having anaerobic microorganisms propagated therein, and a chemical sludge zone having calcium present therein and communicating with a settling part, and to which chemical sludge and biological sludge are introduced;
a slaked lime reaction tank into which slaked lime is added;
a polychlorinated aluminum flocculation tank into which polychlorinated aluminum is added;
a polymer-flocculant flocculation tank into which a polymer flocculant is added; and
a settling tank for performing solid-liquid separation, wherein
hydrogen-peroxide-, nitrate-nitrogen- and organic matter-containing fluorine waste water and silicon waste water are introduced sequentially to these tanks and thereby treated.

25. A waste water treatment apparatus comprising:
a reaction tank comprising an aeration zone having aerobic microorganisms propagated therein and having a membrane separation unit, a biological sludge zone having anaerobic microorganisms propagated therein, and a chemical sludge zone having calcium present therein and communicating with a settling part, and to which chemical sludge and biological sludge are introduced;
a slaked lime reaction tank into which slaked lime is added;
a polychlorinated aluminum flocculation tank into which polychlorinated aluminum is added;
a polymer-flocculant flocculation tank into which a polymer flocculant is added; and
a settling tank for performing solid-liquid separation, wherein
hydrogen-peroxide-, nitrate-nitrogen- and organic matter-containing fluorine waste water and silicon waste water, and organochlorine-compound-containing underground water are introduced sequentially to these tanks and thereby treated.

26. A waste water treatment method comprising:

treating fluorine waste water in a chemical sludge portion of a reaction tank into which calcium-containing chemical sludge is introduced, and after said treating in the chemical sludge portion the waste water moves upwardly in the reaction tank and is treated in an aeration zone of the tank which includes a membrane separation unit.

27. A waste water treatment apparatus comprising:

a reaction tank into which calcium-containing chemical sludge is introduced and which has a membrane separation unit;

a slaked lime reaction tank into which slaked lime is added;

a polychlorinated aluminum flocculation tank into which polychlorinated aluminum is added;

a polymer-flocculant flocculation tank into which a polymer flocculant is added; and a settling tank for performing solid-liquid separation, wherein fluorine waste water is introduced sequentially to these tanks and thereby treated.

28. A waste water treatment apparatus comprising:

a reaction tank into which calcium-containing chemical sludge is introduced and which has a first membrane separation unit;

a slaked lime reaction tank into which slaked lime is added;

a polychlorinated aluminum flocculation tank into which polychlorinated aluminum is added;

a polymer-flocculant flocculation tank into which a polymer flocculant is added; and a membrane separation tank having a second membrane separation unit, wherein fluorine waste water is introduced sequentially to these tanks and thereby treated.

* * * * *